United States Patent [19]

Takanashi et al.

[11] Patent Number: 5,442,780
[45] Date of Patent: Aug. 15, 1995

[54] NATURAL LANGUAGE DATABASE RETRIEVAL SYSTEM USING VIRTUAL TABLES TO CONVERT PARSED INPUT PHRASES INTO RETRIEVAL KEYS

[75] Inventors: Ikuko Takanashi; Shozo Kondo; Katsushi Suzuki; Kazutomo Naganuma; Yoshiko Itabashi; Chikako Kimura; Naohito Inaba, all of Kanagawa, Japan

[73] Assignee: Mitsubishi Denki Kabushiki Kaisha, Tokyo, Japan

[21] Appl. No.: 910,764

[22] Filed: Jul. 8, 1992

[30] Foreign Application Priority Data

Jul. 11, 1991 [JP] Japan ................................. 3-171217

[51] Int. Cl.6 ............................................. G06F 15/403
[52] U.S. Cl. .............................. 395/600; 364/419.08; 364/256.4; 364/274.8; 364/DIG. 1
[58] Field of Search ................ 395/600; 364/419.08, 364/419.13, 256.4, 274.8

[56] References Cited

U.S. PATENT DOCUMENTS

| | | | |
|---|---|---|---|
| 4,661,924 | 4/1987 | Okamoto et al. | 364/900 |
| 4,688,195 | 8/1987 | Thompson et al. | 395/12 |
| 4,887,212 | 12/1989 | Zamora et al. | 364/419.13 |
| 4,994,967 | 2/1991 | Asakawa | 364/419.13 |
| 5,175,814 | 12/1992 | Anick et al. | 395/161 |
| 5,197,005 | 3/1993 | Swartz et al. | 364/419.13 |

FOREIGN PATENT DOCUMENTS 0427240  5/1991  European Pat. Off. .

*Primary Examiner*—Thomas G. Black
*Assistant Examiner*—Jack M. Choules
*Attorney, Agent, or Firm*—Wolf, Greenfield & Sacks

[57] ABSTRACT

The database information retrieval system includes a parser for parsing a natural language input query into constituent phrases with a analysis of the syntax of the phrase. The parser may make use of tables and or dictionaries to aid in terminology identification and grammatical syntax analysis. The system also includes virtual tables for converting phrases from the natural language query into retrieval keys that are possessed by the database. The virtual tables account for particles or terms that modify the phrases in the natural language query. A collating unit is provided in the system for preparing a query or retrieval formula executable in the database from the retrieval keys provided by a virtual table the collating unit selects. Lastly, the system contains a retrieval execution unit for retrieving data from the database on the basis of the database retrieval formula produced by the collating unit.

11 Claims, 30 Drawing Sheets

Fig. 3a
PRIOR ART

WORD DICTIONARY

| HEADER | PART OR SPEECH | TYPE |
|---|---|---|
| SHOOHIN KOODO (COMMODITY CODE) | NOUN | ITEM NAME |
| SHOOHIN GUN KOODO (COMMODITY GROUP CODE) | NOUN | ITEM NAME |
| URIAGE (SALES) | NOUN | ITEM NAME |
| URU (TO SELL) | VERB | ITEM NAME |
| CHOKOREETO RUI (CHOCOLATE AND THE LIKE) | NOUN | DATA EXPRESSION WORD |
| MIRUKU CHOKO (MILK CHOCOLATE) | NOUN | DATA EXPRESSION WORD |
| | | |

Fig. 3C PRIOR ART

DATABASE 9

TABLE A URIAGE JOOHOO (SALES INFORMATION)

| HIZUKE (DATE) | SHOOHIN KOODO (COMMODITY CODE) | SHOOHIN GUN KOODO (COMMODITY GROUP CODE) | URIAGE (SALES) | TOKUISAKI KOODO (CUSTOMER CODE) |
|---|---|---|---|---|
| 89,10,10 | 101 | 200 | 10,000 | 11000 |
| 89,10,10 | 111 | 300 | 50,000 | 11001 |

TABLE B SHOOHIN JOOHOO (COMMODITY INFORMATION)

| SHOOHIN KOODO (COMMODITY CODE) | SHOOHIN MEI (COMMODITY NAME) | SHOOHIN GUN KOODO (COMMODITY GROUP CODE) |
|---|---|---|
| 101 | MIRUKU CHOKO (MILK CHOCOLATE) | 200 |
| 105 | KINOKO NO YAMA (MOUNTAIN OF MASHROOM) | 200 |
| 110 | ICHIGO MIRUKU (STRAWBERRY MILK) | 300 |

TABLE C SHOOHIN GUN JOOHOO (COMMODITY GROUP INFORMATION)

| SHOOHIN GUN KOODO (COMMODITY GROUP CODE) | SHOOHIN GUN MEI (COMMODITY GROUP NAME) |
|---|---|
| 100 | BISUKETTO RUI (BISCUIT AND THE LIKE) |
| 200 | CHOKOREETO RUI (CHOCOLATE AND THE LIKE) |
| 300 | KYANDII RUI (CANDY AND THE LIKE) |

Fig. 4a PRIOR ART

| COLUMN | FILE NUMBER | COLUMN ATTRIBUTE | FILE NUMBER | COLUMN ATTRIBUTE | FILE NUMBER | COLUMN ATTRIBUTE | COLUMN |
|---|---|---|---|---|---|---|---|
| NAME ooooo | 1 | 2 | 2 | 1 | 3 | 2 | — |

Fig. 4b PRIOR ART

| VALUE | COLUMN ATTRIBUTE | FILE NUMBER | COLUMN ATTRIBUTE | FILE NUMBER | COLUMN ATTRIBUTE | FILE NUMBER | COLUMN ATTRIBUTE | VALUE |
|---|---|---|---|---|---|---|---|---|
| TOKYO oooo | 0 | 2 | 2 | 3 | 3 | — | — | |

Fig. 4c PRIOR ART

| FILE NUMBER | COLUMN ATTRIBUTE | FILE NUMBER | COLUMN ATTRIBUTE | FILE NUMBER | COLUMN ATTRIBUTE |
|---|---|---|---|---|---|
| 1 | 2 | 2 | 1 | | |

Fig. 5

PRIOR ART

| INPUT INTERROGATIVE SENTENCE | |
|---|---|
| NOUN | PARTICLE AUXILIARY VERB |
| | |
| | |
| | |
| | |
| | |
| | |
| | |

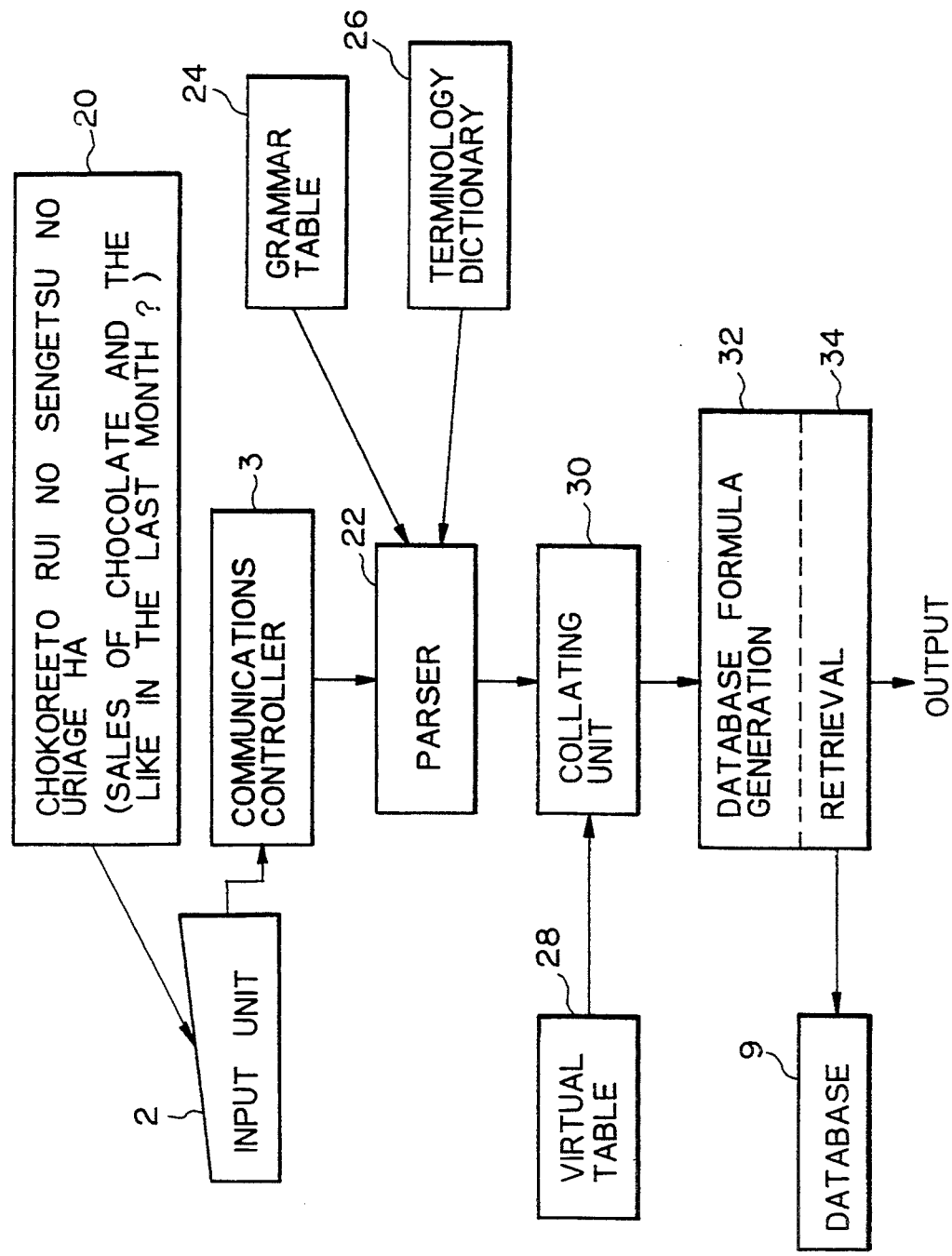

Fig. 7

(TERMINOLOGY DICTIONARY)

| | A PART OF SPEECH | SEMANTIC ID | SEMANTIC MARKER | ITEM |
|---|---|---|---|---|
| SHOOHIN KOODO (COMMODITY CODE) | NOUN | SHOOHIN KOODO (COMMODITY CODE) | SHOOHIN KOODO, KOODO (COMMODITY CODE, CODE) | TABLE 2-1, TABLE 1-2 |
| SHOOHIN MEI (COMMODITY NAME) | NOUN | SHOOHIN MEI (COMMODITY NAME) | SHOOHIN MEI (COMMODITY NAME) | TABLE 2, TABLE 2-2, TABLE 1-3 |
| SHOOHIN (COMMODITY) | NOUN | SHOOHIN MEI (COMMODITY NAME) | SHOOHIN MEI (COMMODITY NAME) | TABLE 2, TABLE 2-2, TABLE 1-3 |
| SHOOHIN GUN KOODO (COMMODITY GROUP CODE) | NOUN | SHOOHIN GUN KOODO (COMMODITY GROUP CODE) | SHOOHIN GUN KOODO, KOODO (COMMODITY GROUP CODE, CODE) | TABLE 3-1, TABLE 2-3, TABLE 1-4 |
| SHOOHIN GUN MEI (COMMODITY GROUP NAME) | NOUN | SHOOHIN GUN MEI (COMMODITY GROUP NAME) | SHOOHIN GUN MEI (COMMODITY GROUP NAME) | TABLE 3, TABLE 3-2, TABLE 1-5 |
| CHOKO RUI (CHOCO AND THE LIKE) | NOUN | CHOKOREETO RUI (CHOCOLATE AND THE LIKE) | SHOOHIN GUN MEI (COMMODITY GROUP CODE) | TABLE 3-2, TABLE 1-5 |
| CHOKOREETO RUI (CHOCOLATE AND THE LIKE) | NOUN | CHOKOREETO RUI (CHOCOLATE AND THE LIKE) | SHOOHIN GUN MEI (COMMODITY GROUP CODE) | TABLE 3-2, TABLE 1-5 |
| URIAGE (SALES) | NOUN | URIAGE (SALES) | URIAGE, KINGAKU (SALES, AMOUNT) | TABLE 1-6 |
| URU (TO SELL) | VERB | URU (TO SELL) | URHAGE, KINGAKU (SALES, AMOUNT) | TABLE 1 |
| SENGETSU (LAST MONTH) | NOUN | SENGETSU (LAST MONTH) | TSUKI (MONTH (DATE)) | TABLE 5 |
| SAKUNEN (LAST YEAR) | NOUN | SAKUNEN (LAST YEAR) | TOSHI (JIKAN) (YEAR (DATE)) | TABLE 6 |
| KOTOSHI (THIS YEAR) | NOUN | KOTOSHI (THIS YEAR) | TOSHI (JIKAN) (YEAR (DATE)) | TABLE 7 |
| HUYU (WINTER) | NOUN | HUYU (WINTER) | KI (JIKAN) (TERM (DATE)) | TABLE 8 |

TABLE 1 (URU HYOO)

| NO. | HEADER | SURFACE RESTRICTION | SEMANTIC RESTRICTION | CORRESPONDENCE ATTRIBUTE |
|---|---|---|---|---|
| 1 | "HIZUKE" (DATE) | ni | HIZUKE, URIAGE, TOSHI, TSUKI, HI (DATE, SALES, YEAR, MONTH, DAY) | DB1-1 |
| 2 | "SHOOHIN KOODO" (COMMODITY CODE) | wo | "SHOOHIN KOODO" (COMMODITY CODE) | DB1-2 |
| 3 | "SHOOHIN MEI" (COMMODITY NAME) | wo | "SHOOHIN MEI" (COMMODITY NAME) | TABLE 2-2 |
| 4 | "SHOOHIN GUN KOODO" (COMMODITY GROUP CODE) | wo | "SHOOHIN GUN KOODO" (COMMODITY GROUP CODE) | DB 1-3 |
| 5 | "SHOOHIN GUN MEI" (COMMODITY GROUP NAME) | wo | "SHOOHIN GUN MEI" (COMMODITY GROUP NAME) | TABLE 3-2 |
| 6 | "URIAGE" (SALES) | | "URIAGE" (SALES) | fun=SUM(DB1-4) |
| 7 | "TOKUISAKI KOODO" (CUSTOMER CODE) | ni | "TOKUISAKI KOODO" (CUSTOMER CODE) | DB 1-5 |
| 8 | "TOKUISAKI MEI" (CUSTOMER NAME) | ni | "TOKUISAKI MEI" (CUSTOMER NAME) | TABLE 4-2 |

TABLE 2 (SHOOHIN MASUTA HYOO)

| NO. | HEADER | SURFACE RESTRICTION | SEMANTIC RESTRICTION | CORRESPONDENCE ATTRIBUTE |
|---|---|---|---|---|
| 1 | "SHOOHIN KOODO" (COMMODITY CODE) | | "SHOOHIN KOODO" (COMMODITY CODE) | DB 2-1 |
| 2 | "SHOOHIN MEI" (COMMODITY NAME) | | "SHOOHIN MEI" (COMMODITY NAME) | DB 2-2 |
| 3 | "SHOOHIN GUN KOODO" (COMMODITY GROUP CODE) | | "SHOOHIN GUN KOODO" (COMMODITY GROUP CODE) | DB 2-3 |

Fig. 8b

TABLE 3 (SHOOHIN GUN MASUTA HYOO)

| NO. | HEADER | SURFACE RESTRICTION | SEMANTIC RESTRICTION | CORRESPONDENCE ATTRIBUTE |
|---|---|---|---|---|
| 1 | "SHOOHIN GUN KOODO" (COMMODITY GROUP CODE) | | "SHOOHIN GUN KOODO" (COMMODITY GROUP CODE) | DB 3-1 |
| 2 | "SHOOHIN GUN MEI" (COMMODITY GROUP NAME) | | "SHOOHIN GUN MEI" (COMMODITY GROUP NAME) | DB 3-2 |

TABLE 4 (TOKUISAKI MASUTA HYOO)

| NO. | HEADER | SURFACE RESTRICTION | SEMANTIC RESTRICTION | CORRESPONDENCE ATTRIBUTE |
|---|---|---|---|---|
| 1 | "TOKUISAKI KOODO" (CUSTOMER CODE) | | "TOKUISAKI KOODO" (CUSTOMER CODE) | DB 4-1 |
| 2 | "TOKUISAKI MEI" (CUSTOMER NAME) | | "TOKUISAKI MEI" (CUSTOMER NAME) | DB 4-2 |

Fig. 8c

TABLE 5

| NO. | HEADER | SURFACE RESTRICTION | SEMANTIC RESTRICTION | CORRESPONDENCE ATTRIBUTE |
|---|---|---|---|---|
| 1 | SENGETSU (LAST MONTH) | | TSUKI (HIZUKE) (MONTH (DATE)) | DEFN. TABLE B-21 |

TABLE 6

| NO. | HEADER | SURFACE RESTRICTION | SEMANTIC RESTRICTION | CORRESPONDENCE ATTRIBUTE |
|---|---|---|---|---|
| 1 | SAKUNEN (LAST YEAR) | | TOSHI (HIZUKE) (YEAR (DATE)) | DEFN. TABLE B-11 |

TABLE 7

| NO. | HEADER | SURFACE RESTRICTION | SEMANTIC RESTRICTION | CORRESPONDENCE ATTRIBUTE |
|---|---|---|---|---|
| 1 | KOTOSHI (THIS YEAR) | | TOSHI (HIZUKE) (YEAR (DATE)) | DEFN. TABLE B-12 |

TABLE 8

| NO. | HEADER | SURFACE RESTRICTION | SEMANTIC RESTRICTION | CORRESPONDENCE ATTRIBUTE |
|---|---|---|---|---|
| 1 | HUYU (WINTER) | | KIKAN (HIZUKE) (PERIOD(YEAR)) | TIME PERIOD DEFN. TABLE A |

Fig. 11

DEFINITION TABLE B

| ARGUMENT | WORD | CALCULATION METHOD |
|---|---|---|
| 1 1 | SAKUNEN (LAST YEAR) | SUBTRACT 1 FROM THE FOUR HIGH ORDER DIGITS, AND REPLACE THE LOW ORDER FOUR DIGITS WITH 0000 |
| 1 2 | KOTOSHI (THIS YEAR) | REPLACE THE LOW ORDER FOUR DIGITS WITH 0000 |
| 1 3 | RAINEN (NEXT YEAR) | ADD 1 TO THE FOUR HIGH ORDER DIGITS, AND REPLACE THE FOUR LOW ORDER DIGITS WITH 0000 |
| 2 1 | SENGETSU (LAST MONTH) | (1) SUBTRACT 1 FROM 4&3 DIGITS<br>(2) IF 4&3 DIGITS RESULT FROM CALCULATION IS 00, REPLACE 4&3 DIGITS WITH 12 AND SUBTRACT 1 FROM THE FOUR HIGH ORDER DIGITS<br>(3) REPLACE THE TWO LOW ORDER DIGITS WITH 00 |
| 2 2 | KONGETSU (THIS MONTH) | REPLACE THE TWO LOW ORDER DIGITS WITH 00 |
| 2 3 | RAIGETSU (NEXT MONTH) | (1) ADD 1 TO 4&3 DIGITS<br>(2) IF 4&3 DIGITS RESULTED FROM CALCULATION IS 13, REPLACE 4&3 DIGITS WITH 01 AND ADD 1 TO THE FOUR HIGH ORDER DIGITS<br>(3) REPLACE THE TWO LOW ORDER DIGITS WITH 00 |
| 3 1 | KINOU (YESTERDAY) | (1) SUBTRACT 1 FROM 2&1 DIGITS<br>(2) IF 2&1 DIGITS RESULTED FROM CALCULATION IS 00, AFTER PERFORMING THE CALCULATIONS (1) AND (2) FOR THE CASE OF CITING NUMBER=21, END OF MONTH DAY IS CALCULATED FROM THE VALUES OF THE FOUR HIGH ORDER DIGITS AND 4&3 DIGITS (YEAR AND MONTH) AND REPLACE 2&1 DIGITS WITH THE CALCULATED RESULT |
| 3 2 | KYOO (TODAY) | NO CALCULATION IS PERFORMED |
| 3 3 | ASHITA (TOMORROW) | (1) ADD 1 TO 2&1 DIGITS<br>(2) IF 2&1 DIGITS EXCEEDS END OF MONTH DAY WHICH IS CALCULATED FROM THE VALUES OF THE FOUR HIGH ORDER DIGITS AND 4&3 DIGITS (YEAR AND MONTH), AFTER PERFORMING THE CALCULATIONS (1) AND (2) FOR THE CASE OF CITING NUMBER=23, REPLACE 2&1 DIGITS WITH 01 |

Fig. 12

QUESTION ("URIAGE" (SALES)) : U R I

"URI HYOO" (SELLING TABLE) ("HIZUKE" (DATE)) : "HIZUKE" (DATE)

"SHOOHIN COODO" (COMMODITY CODE) : *

"SHOOHIN MEI" (COMMODITY NAME) : *

"SHOOHIN GUN COODO" (COMMODITY GROUP CODE) : *

"SHOOHIN GUN MEI" (COMMODITY GROUP NAME) : "CHOKOLATO RUI"
(CHOCOLATE AND THE LIKE)

"URIAGE" (SALES) : URI

"SENGETSU" (LAST MONTH) (DATE : DATE)

QUESTION ("URIAGE" (SALES)) : URI

"URI HYOO" (SELLING TABLE) ("HIZUKE" (DATE)) :19900400

"SHOOHIN COODO" (COMMODITY CODE) : *

"SHOOHIN MEI" (COMMODITY NAME) : *

"SHOOHIN GUN COODO"(COMMODITY GROUP CODE) :CODE

"SHOOHIN GUN MEI" (COMMODITY GROUP NAME) :"CHOKOREETO RUI"
                                                   (CHOCOLATE AND THE LIKE)

"URIAGE" (SALES)

"SHOOHIN GUN JOOHO" (COMMODITY GROUP INFORMATION) ("SHOOHINGUN COODO"
                                                        (COMMODITY GROUP CODE)): CODE

"SHOOHIN GUN MEI" (COMMODITY GROUP NAME) : "CHOKOREETO RUI"
                                                   (CHOCOLATE AND THE LIKE)

"SENGETSU" (LAST MONTH) (DATE :19900400)

Fig. 15

DEFINITION TABLE A

| NAME OF ITEM | START | END |
|---|---|---|
| "KAMIKI" (FIRST HALF) | 0000/04/01 | 0000/09/30 |
| "SHIMOKI" (SECOND HALF) | 0000/10/01 | 0001/03/31 |
| "HARU" (SPRING) | 0000/04/01 | 0000/05/31 |
| "NATSU" (SUMMER) | 0000/06/01 | 0000/09/30 |
| "AKI" (FALL) | 0000/10/01 | 0000/11/30 |
| "HUYU" (WINTER) | 0000/12/01 | 0001/03/31 |
| "NENDO" (ACCOUNTING YEAR) | 0000/04/01 | 0001/03/31 |
| "SHIMEBI" (CLOSING DATE) | 0000/09/16 | 0000/00/15 |

Fig. 18

DATABASE RETRIEVAL WORD GRAMMAR DEFINITION TABLE 155

| TYPES OF TABLE | DATABASE RETRIEVAL WORD DEVELOPMENT PATTERN |
|---|---|
| RESULT TABLE | SELECT (ITEM) FROM (REFERENCE TABLE) WHERE(CONDITION) |
| INTERMEDIATE RESULT TABLE | SELECT (ITEM) FROM (REFERENCE TABLE) WHERE (CONDITION) |
| GT TABLE | LEFT SIDE > RIGHT SIDE |
| EQ TABLE | LEFT SIDE = RIGHT SIDE |
| TOTAL TABLE | SUM (CALCULATION OBJECT ITEM) |

Fig. 19

EXAMPLE OF DATABASE RETRIEVAL FORMULA (INTERROGATION 1) → THE LAST MONTH'S INTERMEDIATE RESULT TABLE
SELECT     CUSTOMER TABLE AND CODE,
           SUM (THE AMOUNT OF RECEIVED ORDER FILE)
FROM       CUSTOMER TABLE, RECEIVED ORDER FILE TABLE
WHERE      YEAR AND MONTH OF RECEIVED ORDER FILE (INTERROGATION 2) → THIS MONTH'S INTERMEDIATE RESULT TABLE
           THE SAME AS (INTERROGATION 1) WHERE DATE THIS MONTH (INTERROGATION 3) → RESULT TABLE
SELECT     CUSTOMER TABLE AND NAME, TOTAL SALES OF THE LAST
           MONTH TABLE, TOTAL SALES OF THIS MONTH TABLE
FROM       CUSTOMER TABLE, THE LAST MONTH'S INTERMEDIATE RESULT TABLE
           THIS MONTH'S INTERMEDIATE RESULT TABLE
WHERE      SALES OF THIS MONTH TABLE > SALES OF THE LAST MONTH TABLE
AND        CUSTOMER CODE OF THIS MONTH'S INTERMEDIATE RESULT TABLE =
           CUSTOMER TABLE AND CODE

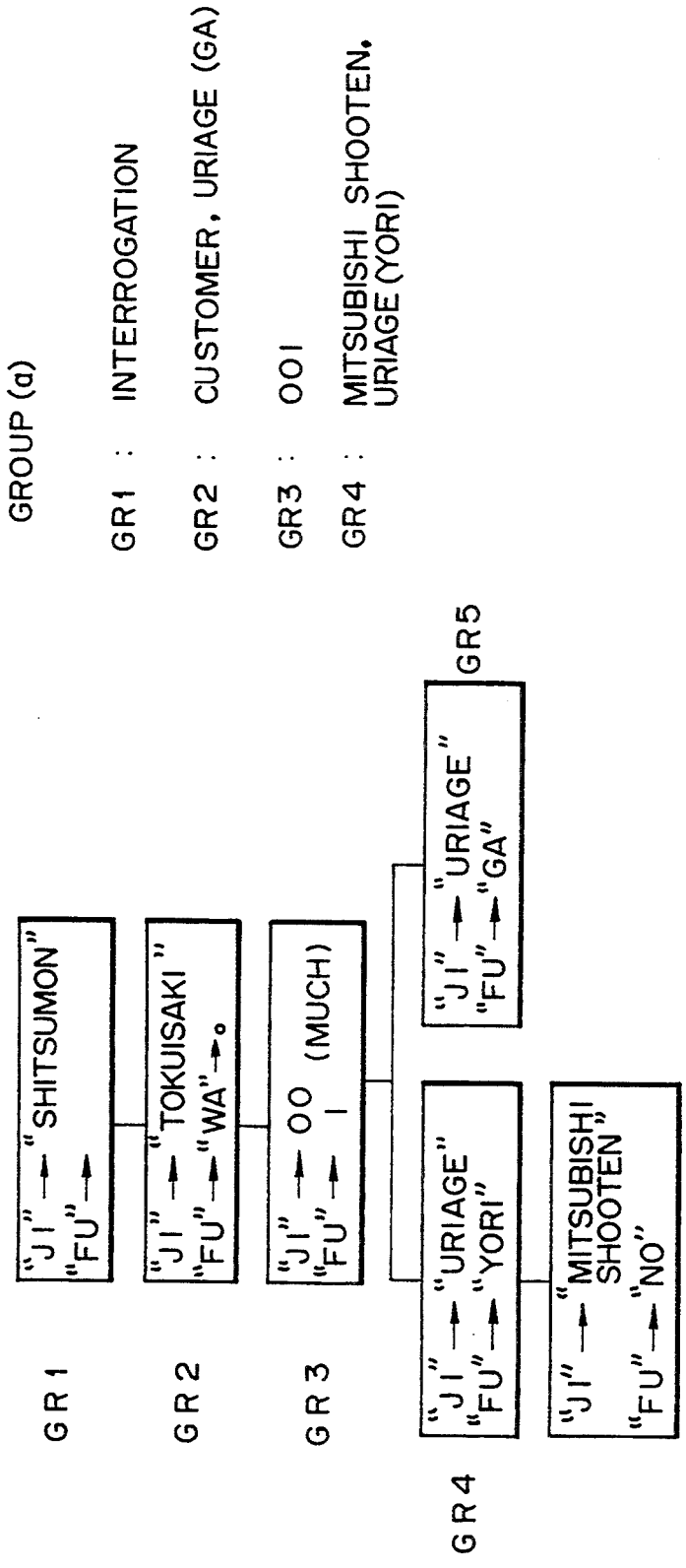

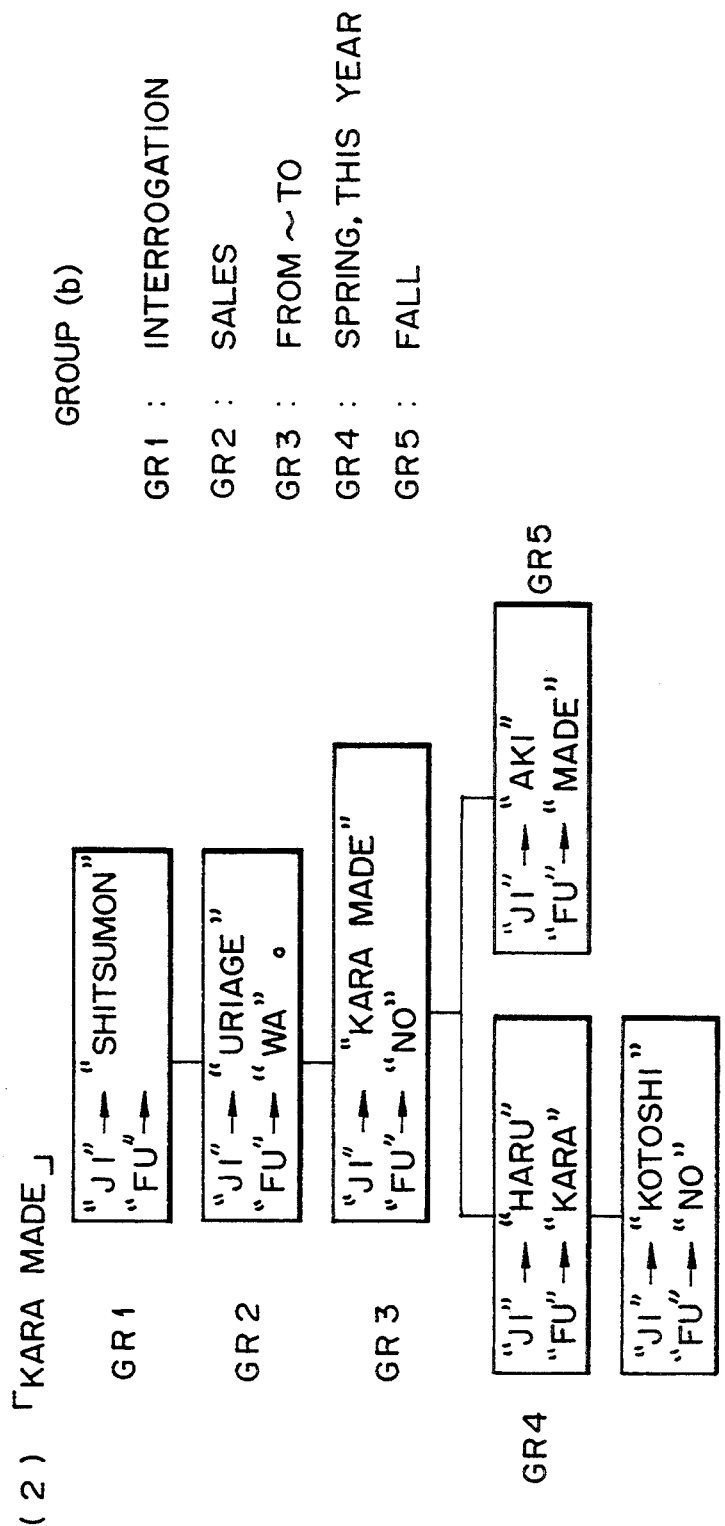

Fig. 21a

| NO | HEADER | SURFACE RESTRICTION | SEMANTIC RESTRICTION | CORRESPONDENCE ATTRIBUTE |
|---|---|---|---|---|
| 0 | I O O | | | |
| 1 | | G A, W A | SALES, UNIT COST, GROSS, RATIO, AMOUNT | f u n − G T ( 1 ) |
| 2 | | Y O R I | SALES, UNIT COST, GROSS, RATIO, AMOUNT | f u n − G T ( 2 ) |
| 3 | | H A, Q A | SALES, UNIT COST, GROSS, RATIO, AMOUNT | |

Fig. 21b

| NO | HEADER | SURFACE RESTRICTION | SEMANTIC RESTRICTION | CORRESPONDENCE ATTRIBUTE |
|---|---|---|---|---|
| 0 | | | | |
| 1 | | | DATE | fun-BETWEEN(0) |
| 2 | | KARA | DATE | fun-BETWEEN(1) |
| 3 | | MADE | DATE | fun-BETWEEN(2) |

NATURAL LANGUAGE DATABASE RETRIEVAL SYSTEM USING VIRTUAL TABLES TO CONVERT PARSED INPUT PHRASES INTO RETRIEVAL KEYS

BACKGROUND OF THE INVENTION

1. Field of the Invention

This invention relates generally to database retrieval systems for retrieving information stored in a database, and, more particularly, to database retrieval systems for retrieving information stored in a database using natural language expressions.

2. Description of the Prior Art

FIG. 1 is a diagram illustrating a conventional database retrieval system for retrieving data from a table formatted database in response to a natural language query. A natural language query is a request for data that is set forth in a natural language, such as English, Japanese, French, etc. The illustrated database retrieval system is described in more detail in "Kinukawa, A Natural Language Interface Processor Based on the Hierarchical-Tree Structure Model of Relation Table. *Journal of Information Processing Society of Japan*, Vol.27, No.5 (1986), pp.499-509." This system is designed to process queries in Japanese. For the examples described below, the English translations of Japanese words and phrases are provided in parenthesis.

The database retrieval system shown in FIG. 1 includes an input unit 2, such as a keyboard, for entering a natural language query 1. The system also includes a communications controller 3 for forwarding the natural language query 1 to a retrieval sentence analysis unit 5. The retrieval sentence analysis unit 5 processes the input query 1 to produce a hierarchical model of the query. The system additionally includes a word dictionary 4, that is constructed on the basis of the content of a database 9, and a hierarchical table model 6 for hierarchically expressing the content of the database. The dictionary 4 and hierarchical table model 6 are used by the retrieval sentence analysis unit 5 in analyzing the natural language query 1. The retrieval sentence analysis unit 5 performs both vocabulary analysis and syntactic/semantic analysis on the natural language query 1. The retrieval sentence analysis unit 5 produces a retrieval sentence analysis result 7 as output that is forwarded to a retrieval processing unit 8. The retrieval processing unit 8 uses the retrieval sentence analysis result 7 to retrieve data from the database 9.

The depiction of the conventional database retrieval system shown in FIG. 1 is a functional description intended to show the interaction between the respective components of the system. The components shown in FIG. 1 are, in fact, implemented in a data processing system 10, such as that shown in FIG. 2. The data processing system 10 includes a central processing unit (CPU) 11, a memory 12, the communications controller 3, an output device 17 and the input unit 2. Each of these components is coupled to a bus 13. The retrieval sentence analysis unit 5 and the retrieval processing unit 8 are implemented in software that is executed by the CPU 11 (FIG. 2). The software is stored in the memory 12. The word dictionary 4 (FIG. 1), the hierarchical model table 6 and the database 9 are stored within the memory 12 (FIG. 2).

FIG. 3a provides a more detailed depiction of an example of the word dictionary 4. As this Figure shows, the dictionary includes a plurality of entries, and each entry includes three fields. The header field identifies the term or phrase associated with the entry, whereas the part of speech field identifies the part of speech of the term or phrase. Lastly, the type field identifies the type of term or phrase that is used. In the example shown in FIG. 3a, the types are "item name" and "data expression word".

FIG. 3b provides a more detailed depiction of the hierarchical table model 6. This model 6 sets forth the hierarchical relationship between the respective tables. Each table specifies a number of attributes. For instance, table 14 includes the attributes of "date", "commodity code", "commodity group code", and "sales". The "commodity code" attribute is also an attribute in table 16, which is hierarchically related with table 14. Similarly, the attribute of "commodity group code" is an attribute of both table 16 and table 18. The table 14 is a higher order table than tables 16 and 18. Moreover, table 16 is a higher order than table 18. This hierarchical table model is consistent with the relational model for data proposed by E. F. Todd in "A Relational Model of Data for Large Shared Data Banks," *Communications of the ACM*, June 1970, pp. 377–387.

Table 3c provides illustration of the database 9. The database 9 includes table A, table B and table C. Each of the tables A, B, C includes different types of information. For example, table A contains sales information, table B includes commodity information, and table C includes commodity group information. These tables are used in conjunction to obtain information requested by the natural language query 1 (FIG. 1).

Operation of the system shown in FIG. 1 will now be described. Initially, a natural language query 1 is entered using the input unit 2. When a keyboard is used as the input unit 2, the query is entered simply by typing the query. The query 1 is then passed to the conversation control unit 3, which forwards the query to the retrieval sentence analysis unit 5. The retrieval sentence analysis unit 5 parses the query into a hierarchical structure of words or phrases that is output as the retrieval sentence analysis result 7. In processing the query, the retrieval sentence analysis unit 5 first chops the query into words or phrases. In the present example, the query is chopped into the phrases "chokoreeto rui" and "uriage". The terms "no" and "ha" are zyoshi, whose significance will be described in more detail below.

Once the query has been divided into words or phrases, vocabulary analysis is performed on the words or phrase to determine what each word or phrase in the query signifies. In performing such vocabulary analysis, the retrieval sentenced analysis unit 5 references the word dictionary 4 to determine that "chokoreeto rui" (chocolates and the like) is a data expression word (see FIG. 3a). The retrieval sentence analysis unit 5 also determines that "uriage" (sales) is an attribute item name, respectively. The word dictionary 4 indicates that both of these phrases are nouns. The dictionary 2 is not referenced for the zyoshi "ha" and "no".

Syntax and semantic analysis is then performed on the query. In particular, syntactic analysis is performed to process the syntax or the query in order to understand the role each phrase serves in the query. Semantic analysis, on the other hand, is performed to understand what is being requested by the query.

Subsequently, semantic analysis is performed to relate the meaning of the query to the database entries. The semantic analysis relies on the hierarchical table model 6 (see FIG. 3b) to ascertain that "chokoreeto rui" (chocolates and the like) is an attribute data expression word of a commodity group in table 18 (i.e., table C in FIG. 3c) and "uriage" (sales) is an item name in the table 14 (i.e. table A in FIG. 13c). Moreover, the hierarchical table model 6 (FIG. 3b) indicates that table 14 is a higher order table than table 18. Since the attribute item appearing in the low order table is a noun, and a zyoshi "no" is added thereto, it is recognized that the attribute "chokoreeto rui" in table 18 modifies the attribute "uriage" (sales), which appears in a higher order table 14. Using these results, a retrieval formula "retrieval condition: (commodity group name=chokoreeto rui), retrieval object: uriage" is obtained and is output from the retrieval sentence analysis unit 5. Subsequently, retrieval from the database 9 is performed by the retrieval processing unit 8 to obtain the desired data.

FIGS. 4a, 4b and 4c show dictionaries used in a second conventional database retrieval system, as disclosed in Japanese Patent Laid-Open Publication No. 59-99539. In these dictionaries, information on column name in a file, information on data item name, and information on a file name that possesses a common column name or data name, are stored according to file names of a data file that is contained in a database. FIG. 4a represents a dictionary in which one of the database files contains the column name of a file. The dictionary also holds information regarding the order in which the column is contained in the file and additionally holds information regarding synonyms of the column name (i.e., file numbers and column attribute numbers of columns that are synonymous with the named column). FIG. 4b shows an analogous dictionary in which one of the files contains a data column name, and the dictionary stores a position at which the named column is contained in the file. Lastly, the dictionary stores information regarding synonyms of the data column name. FIG. 4c shows a dictionary holding information as to semantically identical data columns that are connected as synonyms.

FIG. 5 is the designated format for input queries for the second conventional system. This format requires that queries be entered as a number of entries, wherein each entry includes two fields; a noun filed and a particle or auxiliary field. Thus, for the example query 1 (FIG. 1) used in the discussion of the first conventional system, the input query for the second conventional system would be as follows. The first noun field would be entered as "chokoreeto rui" and the corresponding particle field would be entered as "no". Further, the second noun field would be entered as "uriage" and the particle field would be entered as "ha".

In this second conventional system, queries in a natural Japanese format cannot be analyzed. Likewise, the retrieval object is determined in view of the restriction of the designated format shown in FIG. 5. A pertinent data file may, thus, be accessed only by limited terminology including synonyms recorded in the dictionaries.

In the first conventional information retrieval system described above, it is necessary to have previously constructed a hierarchical table model. Since, however, in general, it is not always possible to place the content of a database into a hierarchy, input sentences which do not fall under the defined hierarchical structure cannot be processed. Further, there is no flexibility in receiving natural language phrases or words, such as "sengetsu" (last month) which are not in the database. The system is limited solely to the phrases included in the database. Still further no information is provided on "zyoshi" (particles). Thus, there is also the problem that the ommission of a "zyoshi" cannot be detected.

In addition, when there is an ambiguous word (for example, time periods or seasons), syntactic analysis is impossible unless the definition of the ambiguous word is recorded in detail. In some cases, each interrogator must record the definition on an individual basis according to his usage of the ambiguous term.

Information retrieval is performed for each of the items recorded in a file. Thus, an answer cannot be obtained for a question in which a plurality of files are retrieved as a result of analyzing the input sentence and in which it is necessary to process such a retrieval result to obtain a final result.

SUMMARY OF THE INVENTION

The foregoing problems in the prior art are overcome by the present invention of an information retrieval system. The information retrieval system of the present invention is used for retrieving information from a database. The information retrieval system includes a parser for parsing a natural language input query into constituent phrases. The parser outputs a syntax analysis result. The system also includes a virtual table for converting phrases of the natural language query to retrieval keys that are possessed by the database. The virtual table accounts for particles that modify the phrases in-the input query. A collating unit is provided in the system for preparing a database retrieval formula from the syntax analysis result by selecting a virtual table that it is used to convert the phrases to the keys possessed by the database. Lastly, the system includes a retrieval execution unit for retrieving data from the database on the basis of the database retrieval formula.

The information retrieval system may also include an additional table for converting an undetermined value phrase in the natural language query into a determined value phrase in the database based on the syntax analysis result. Still further, the information retrieval system may include a terminology dictionary for identifying entries in the virtual table that are to be used in converting phrases of the natural language query. The dictionary includes words representing times and the dictionary is used by the parser in obtaining the syntax analysis result. When the terminology dictionary is used, the system may also include a time interval definition table in the virtual table for defining dates corresponding to words representing time. Lastly, the system may include a database retrieval formula conversion unit for generating a formula in a database retrieval language from the database retrieval formula.

BRIEF DESCRIPTION OF THE DRAWINGS

FIG. 3a is a more detailed depiction of the word dictionary 4 of FIG. 1;

FIG. 3c is a more detailed depiction of the database 9 of FIG. 1;

FIGS. 4a–4c illustrate dictionaries in a second conventional database retrieval system;

FIG. 5 illustrates the input format for queries with the second conventional database retrieval system;

FIG. 6 is a block diagram of an embodiment of the present invention illustrating the processing performed by the embodiment;

FIG. 7 is a more detailed depiction of the terminology dictionary 26 of FIG. 6;

FIGS. 8a–8c are more detailed depictions of tables held in the virtual table 28 of FIG. 6;

FIG. 11 is a more detailed depiction of a definition table in the virtual table 28;

FIG. 12 is a depiction of an example natural language correspondence logic formula;

FIG. 13 is a depiction of the modified version of the formula of FIG. 12

FIG. 15 is a depiction of a Definition Table A in the virtual table 28 of FIG. 6;

FIG. 18 is a depiction of a database retrieval word grammar definition table 155 that is contained in the virtual table 28 of FIG. 6;

FIG. 19 is an example of a database retrieval formula processing for the entity table logic formula of FIGS. 17a–17c;

FIGS. 20a and 20b illustrate the grouping in syntactic trees of two complex queries; and FIGS. 21a and 21b depict additional virtual tables employed for the processing of the queries of FIGS. 20a and 20b.

DETAILED DESCRIPTION OF THE PREFERRED EMBODIMENTS

Figure 1:
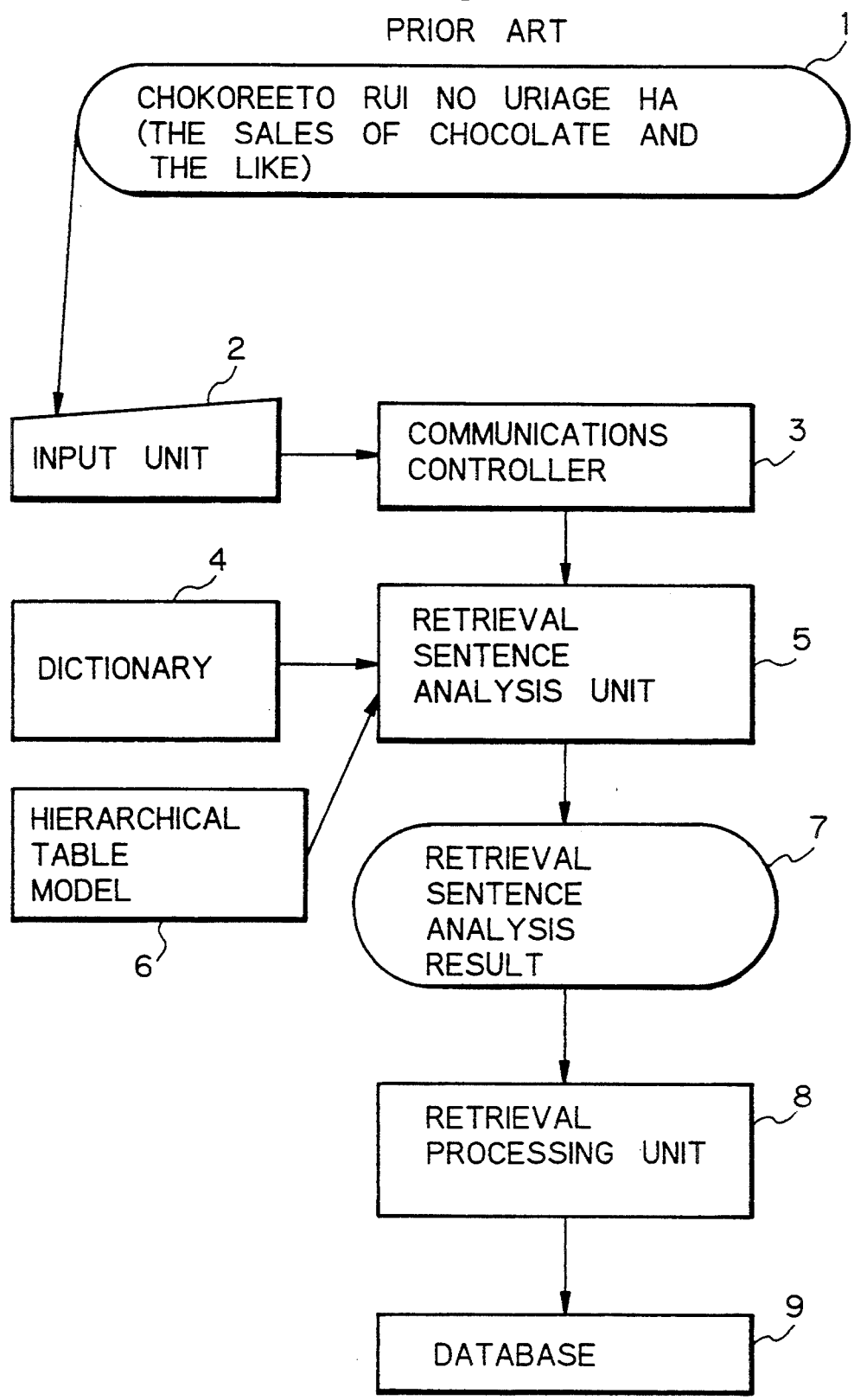
FIG. 1 is a block diagram of a first conventional database retrieval system illustrating the processing performed by the system.

A preferred embodiment of the present invention will now be described with reference to the drawings. FIG. 6 shows the construction and flow of processing of a first preferred embodiment of the present invention which provides a database retrieval system that responds to a natural language query 1. Like the first conventional system of FIG. 1, the system may be implemented on a data processing system as shown in FIG. 2. This first preferred embodiment includes an input unit 2, a conversation control unit 3 and a database 9 like that employed in the conventional system of FIG. 1. These components are implemented in the data processing system 2 as discussed for the first conventional system. The preferred embodiment, however, differs from the conventional system in several respects. These distinctions are highlighted below.

The first preferred embodiment also includes a parser 22 for parsing an input natural language query into its constituent parts. The parser 22 uses a grammar table 24 and a terminology dictionary 26. The grammar table 24 holds information for regulating the relation in a Japanese sentence, and the terminology dictionary 26 defines the part of speech and meaning of each word in the query 22. While the terminology dictionary 26 is similar to the conventional word dictionary 4 shown in FIG. 1, the terminology dictionary of FIG. 6 differs in that is includes a column for a semantic marker (see FIG. 7). The role of the semantic marker is described in more detail below. A column for a semantic ID (see FIG. 7) and a column for a correspondence item are also provided. The parser analyzes the input query 22 to determine the subject, predicates and other parts of speech in the input natural language query 22.

Figure 2:
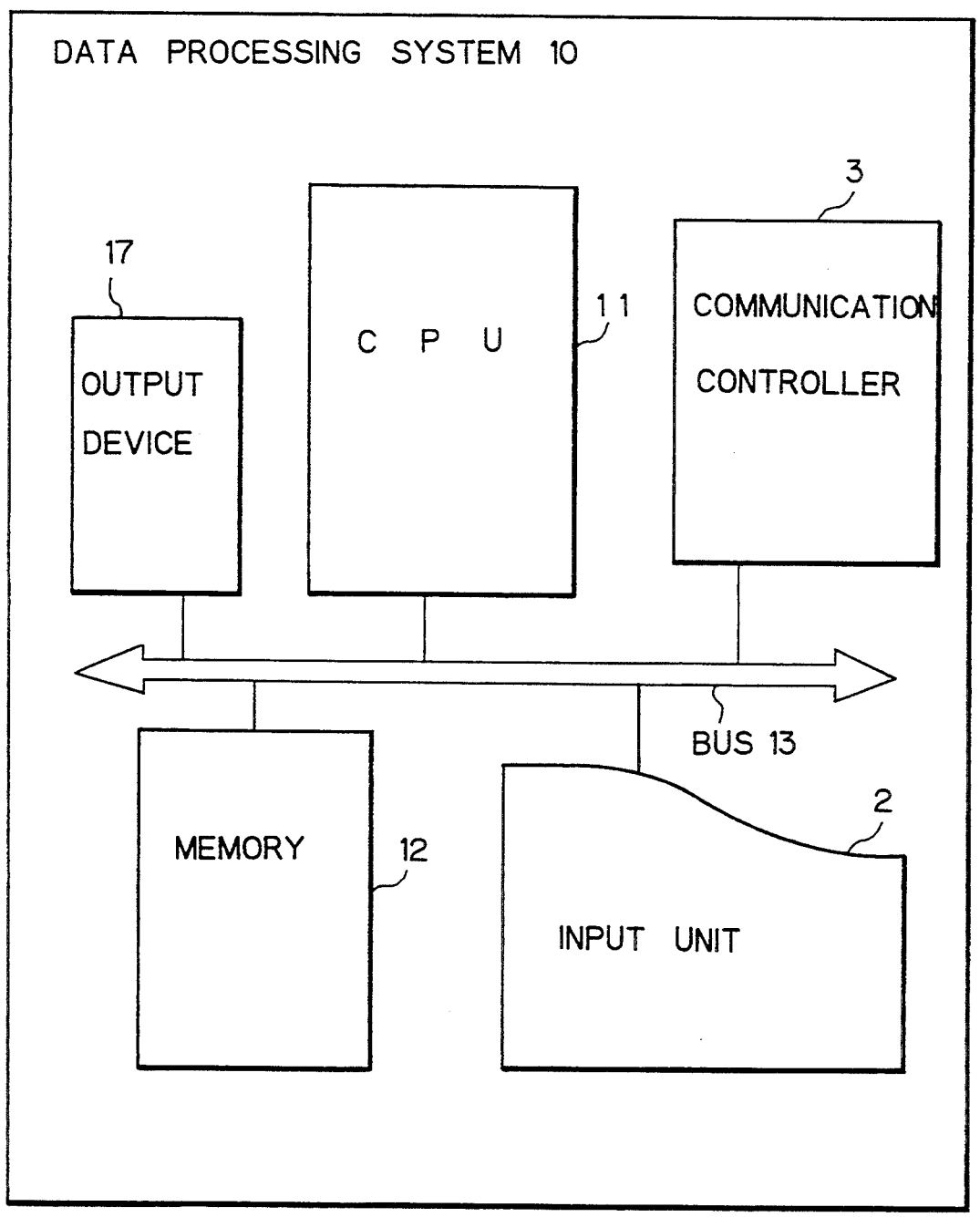
FIG. 2 is a block diagram of a data processing system suitable for implementing the first conventional system.

The system of FIG. 6 differs substantially from the conventional system of FIG. 1 in that the system of FIG. 6 includes a virtual table 28. The virtual table is a natural language conversion virtual table held in memory 12 (FIG. 2), for designating which table in the database 9 is to be searched to find the data requested in the query 22.

In general, there are two types of data in the database 9. There is fixed data, such as a master file for defining "object", and there is variable data, which continuously changes in accordance with "event". Variable data is also referred to as a cumulative file. Fixed data having the same characteristics are grouped to form a virtual table. Further, a virtual table is formed by adding variable data to those fixed data items which are strongly related thereto.

The virtual table 28 is composed of a number of tables (i.e. tables 1–8) as shown in FIGS. 8a–8c. Each one of the entries in these tables includes a field for a "surface restriction" (see FIGS. 8a–8c) and a field for a "correspondence attribute" is included for each entry. The surface restriction field is filled with data only for variable data. The surface restriction field is used to store particles which modify each header word of the input natural language and which determine the value of the "correspondence attribute" in combination with the header word. That is, the surface restriction is an item that is provided for performing a further selection when a plurality of corresponding attributes are possible for a header word.

The correspondence attribute may designate another virtual table, a database entity table, or an operation entity table. Designation of another virtual table indicates that detailed data are stored in the other table. Further, the storage in this fashion is used in an algorithm for selecting a virtual table. Specifically, if a virtual table is designated in a correspondence attribute field, the designated virtual table is selected with priority.

The system of FIG. 6 also includes a collating unit for retrieving data from the database 9 by referencing the virtual table 28 using the analysis result that is output from the parser 5. The collating unit may be implemented in software that is executed by the CPU 11 (FIG. 2) and stored in memory 12.

The system further includes a database formula generation unit 32 for converting an entity table logic formula from the collating unit into a database retrieval formula. The database retrieval formula is used by a retrieval unit that retrieves data from the database 9.

Terms such as "no" and "ha" in the input natural language query 20 are zyoshi. In Japanese, these terms serve to identify the role served by the words that precede them. For instance, in the example natural language input query 20 shown in FIG. 6, the zyoshi "no" modifies the phrase "Chokoreeto rui" (chocolates and the like) to indicate that "Chokoreeto rui" is the object of a prepositional phrase. Similarly, the zyoshi "no" follows the word "sengetsu" to indicate that "sengetsu" is the object of a prepositional phrase. Lastly, the zyoshi "ha" modifies: the term "uriage" (sales) to indicate that "uriage" is the subject of the query. The zyoshi help to construct the hierarchical model shown in FIG. 9 that is output from the parser 22.

Before discussing the operation of this system in detail, it is helpful to provide an overview of operation of the system. Initially, the natural language input query 20 (FIG. 6) is input by the input unit 2 and received by the communications controller 3. The communication controller directs the input query to the parser 22. The grammar table 24 is used by the parser 22 to examine grammatical rules that help to parse the table into an appropriate syntax tree like that shown in FIG. 9. The parser 22 also uses the terminology dictionary 26 to determine which of the tables in the virtual table 28 should be examined. Specifically, the "item" column of the terminology dictionary, as shown in FIG. 7, is examined.

The collating unit 30 (FIG. 6) then determines which of the tables in the virtual table 28 will be utilized. For the example of natural language query 20, table 1 (see FIG. 8a) is examined. The entries for the corresponding terms are examined in the table. The correspondence attribute field of the entries specify the table in the database 9 (FIG. 6) and entry where information regarding the term of interest may be found, another correspondence table or an indication that the desired data is calculated as a mathematical function. The information retrieved by the collating unit 30 (i.e., the entity table logical formula) then is passed onto the database formula generation unit 32 that converts this information into a database retrieval formula for retrieving from the database. The database retrieval formula is passed from the database formula generation unit 32 to the retrieval unit 34, which retrieves the appropriate data from the database 9. The retrieved data is then output to the output device 17 (FIG. 2).

The operation of the system of FIG. 6 will now be described in detail. Initially, a natural language query 1 "Chokoreeto rui no sengetsu no uriage ha?" (Sales of chocolates and the like in the last month?) is entered using the input unit 2. The communications controller 3 passes this query to the parser 22. Retrieval order and operation order of the retrieval language are defined at the communications controller 3. The parser 22 parses the query according to known strategies for parsing Japanese queries to produce a syntax analysis result (like syntax tree shown in FIG. 9). The parser 5 uses the grammar table 34 and the terminology dictionary 26 in performing its parsing. The grammar table 24 is a set of extended context-free grammatical rules such as outlined in "Iwanami Koza, Zyoho Kagaku 23: Kazu to Shiki to Bun no Shori", Chapter 5 'Kikai Honyaku', Iwanami Shoten".

The terminology dictionary 26 also has a format as outlined in the above described article. This format is shown in FIG. 7. To eliminate ambiguities in the meaning of a word, a semantic ID is given to each word. The semantic ID helps to associate the input term or words with term or words that are understandable to the database 9 (FIG. 6). For example, since there is no retrieval key for "shoohin" (commodity), "shoohin mei" (commodity name) is designated as the semantic ID for "shoohin". The database 9 (FIG. 6) includes information regarding the commodity name. Analogously, since there is no entry for "choko rui" (chocolates and the like) in the database, "chokoreeto rui" (chocolates and the like) is designated as its semantic ID.

Each entry in the terminology dictionary 26 (FIG. 7) also includes a semantic marker. The semantic marker is provided to connect an ambiguous word (i.e., not directly defined in the virtual table) to a correspondence attribute. Further, the semantic marker serves to combine words that are identical under the semantic restriction in the virtual table. For example, since there are no such retrieval keys for "sengetsu" (last month) in the virtual table 28 (FIG. 6), the semantic marker for this term is month (date), hence, indicating that this term is an indication of date on a monthly basis. Similarly, the term "Kyonen" (last year), "hi" (day) and "toshi" (year) are also assigned semantic markers that indicate that the terms refer to date. A plurality of semantic markers may be allowed for a word (e.g. "uriage" in FIG. 7). In such instances, the item in the virtual table 28 (FIG. 6) that is capable of corresponding to a retrieval key of the database 9 is searched by following semantic restriction on the virtual table designated by the semantic marker. Further, in the terminology dictionary 26, a column for corresponding items (e.g. the "ITEM" column in FIG. 7) is provided for designating which one of the tables of the virtual table 28 (FIG. 6) should be referenced.

Furthermore, in the case wherein the term, for which a terminology dictionary entry is sought, is a numerical value having no corresponding virtual table entry, a correspondence attribute is determined by the modifying-modified relation thereof or a semantic marker for units of numerical values. Alternatively, an actual value is determined in accordance with the definition of an entity table.

As a result of the analysis, performed by the parser 22, the construction of the query is identified and the object of the interrogation is known. It is necessary to B conform the object of interrogation to an item possessed by the database. While several methods may be employed for this purpose, the most effective method is one in which the virtual table is provided to associate similar meanings which are referenced as different words in the database. By providing a virtual table, alteration and/or addition of the system is easy compared to a method in which the retrieval object item of the database is directly entered into a terminology dictionary. Further, a variety of different natural Japanese queries may be correctly processed and the queries may employ various different modifier representations.

Figure 9:
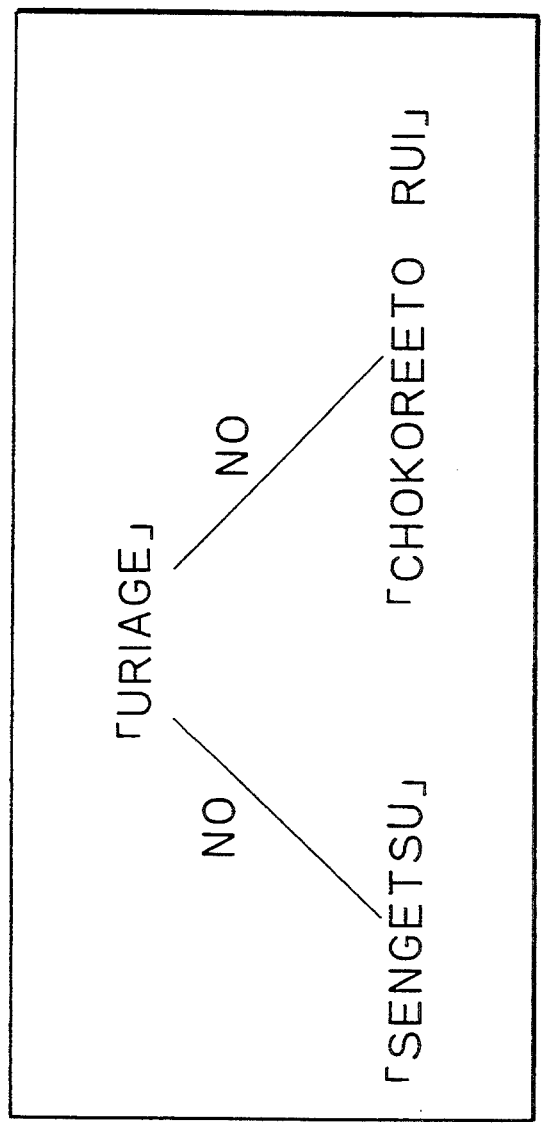
FIG. 9 is an illustration of a syntax tree that is output by the parser 22.

The parser 22 (FIG. 6), thus, produces a hierarchical syntax tree like that shown in FIG. 9. This result indicates that the sales (i.e. "uriage") are what is sought. The term "Chokoreeto rui" (chocolate and the like) specifies the commodity group for which sales are sought, and the term "sengetsu" (last month) indicates the time frame for which the sales data is sought. This syntax tree is passed to the collating unit as the syntax analysis result (see step 40 in FIG. 10). The syntax tree is not directly converted into a database retrieving logic formula, but rather is converted into an intermediate representation known as a virtual table logic formula. Then an appropriate table in the virtual table 28 (FIG. 6) is selected (step 42 in FIG. 10).

For the example query 20 of FIG. 6, the terminology dictionary 26 (FIG. 7) is referenced. Specifically, the "item" field is examined for "sengetsu" (last month). The item field points to Table 5 in the virtual table 28 (FIG. 6). Thus, Table 5 (FIG. 8c) in the virtual table 28 (FIG. 6) is examined. The entry for "sengetsu" has a correspondence attribute pointing to Definition Table B-21. Accordingly, the entry with argument 21 in Definition Table B is examined (see FIG. 11a). This table entry sets forth the method of calculation for "sengetsu". "sengetsu" (the last month) is a value which varies according to the point in time of input and, therefore, must be calculated.

In order to understand the method, it is important to first understand the format in which the date is held. The current data is an 8 decimal digit number with digits 8-5 holding the year (e.g. "1992"), digits 4 and 3 holding the month (e.g. "07", for July) and bits 2 and 1 holding the date (e.g. "11"). Thus, an example format for the date of Jul. 11, 1992 is "19920711".

If Jul. 11, 1992 is the current date, the Definition Table B tells the system how to calculate the last month (i.e. June or "06"). First one is subtracted from the month digits 4 and 3. Hence, a result of (07-1) or 06 is obtained. Then, the system checks whether the result is 00. In this case, the result is not zero. If the result of the subtraction is 00, it is an indication that the last month was December of the previous year. Therefore, the month digits 4 and 3 are replaced with the digit 12 for December, and the year digits 8-5 (the high order digits) are decremented by one. Lastly, the day digits 1 and 2 are replaced with 00.

Next, a table in the virtual table 28 (FIG. 6) for "sengetsu" (last month) is selected. In the terminology dictionary 26 (FIG. 7), a plurality of virtual tables are designated for "chokoreeto rui" (chocolates and the like). Specifically, Tables 1 and 3 are designated. An entry in the terminology dictionary 28 is also examined for the term "uriage" (sales). The entry for "uriage" (sales) designates Table 1. Given that both the entry for "Chokoreeto rui" and the entry for "uriage" specify Table 1 of the virtual table 8, Table 1 is selected. Once the appropriate table in the virtual table 28 is selected, an intermediate representation is formed by the collating process (step 44 in FIG. 10) performed by the collating unit 30.

The collating unit 30 (FIG. 14) internally comprises: a virtual table selection unit 60, for selecting a table in the virtual table 28 (FIG. 6); an actual value calculation/combination unit 62 (FIG. 14) for performing calculations and combination; and an interrogative structure determining unit 64 for determining the structure of interrogations that are passed to the database formula generation unit 32.

Figure 14:
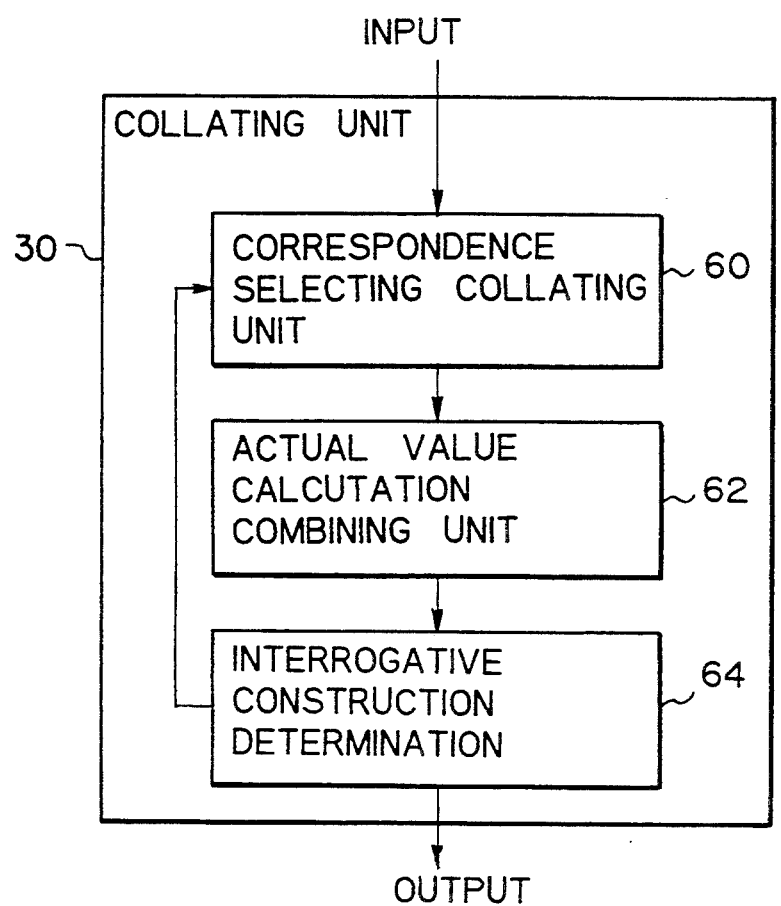
FIG. 14 is a more detailed depiction of the collating unit 30 of FIG. 6.

The collating process involves incorporating the contents of a dictionary referenced by the input natural language query into the table of the virtual table that was selected at step 42 in FIG. 14 or by performing attribute coupling between virtual tables. In the example case, two virtual tables have been selected: Table 1 (by the entries in the terminology dictionary for "uriage" and "Chokoreeto rui") and Table 5 (by the entry for "sengetsu"). A natural language correspondence logic formula 50 is generated as shown in FIG. 12. The correspondence logic formula 50 is a table that sets forth what information is known from the query and what additional information is needed to complete the query. Specifically, it sets forth the relevant variables and any values of these variables that are known.

"Chokoreeto rul" is entered in the "shoohin gun mei" (commodity group name) in the formula 50 as "chokoreeto rui" (chocolates and the like) is a commodity group name. This is known from the first table in the virtual table 28 (FIG. 6). Further "URI" and "date" are variables for which the values are not yet determined. Those variables represented by the same word have the same value and represent that same attribute. In this example, "URI" in the question and "URI" in "uriage hyo" are identical to each other. Note that values for those items other than the necessary items are not needed. A mark "*" indicates that no value is entered.

Figure 10:
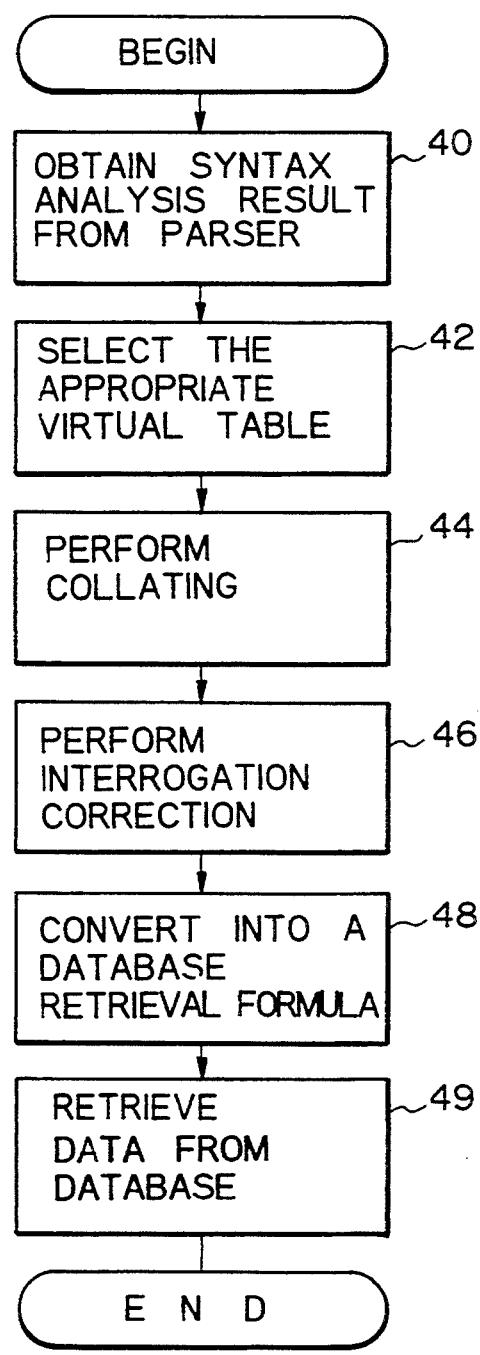
FIG. 10 is a flowchart of steps performed by the system and processing a natural language query.

In step 46 of FIG. 10, a necessary virtual table is added to access the database 9 (FIG. 6). In this example, table 3 (FIG. 8b) of the virtual table 28 (FIG. 6) is selected based on correspondence attribute of "shoohin gun mei" 7 (commodity group name) in table 1 (FIG. 8a), which specifies Table 3-2. The entry in table 3 directs the user to Database Table entry 3-2 (e.g. DB 3-2). In addition, the actual value of "sengetsu" (last month) is calculated from the Definition Table B (as was discussed above). The table, thus, provided is indicated by 52 in FIG. 13. The data shown assumes that the current date is in May 1990. Hence, the last month is April 1990 or "19900400". The commodity group code serves as the attribute for connecting Table 1 and the commodity group master table, and it possesses "Code" as an undetermined variable.

This table 52 is converted into a database retrieval formula by the database formula generation unit 32 (FIG. 6) at step 48 (FIG. 10). Retrievals are performed sequentially by the retrieval unit 34 (FIG. 6) based on the retrieval formula to fill the undetermined variables in the table 52 (FIG. 13). First, the undetermined variable "Code" is determined from commodity group master table 19 (i.e., table C in FIG. 3c) to be 200, which corresponds to "chokoreeto rui" (chocolates and the like).

Figure 3B:
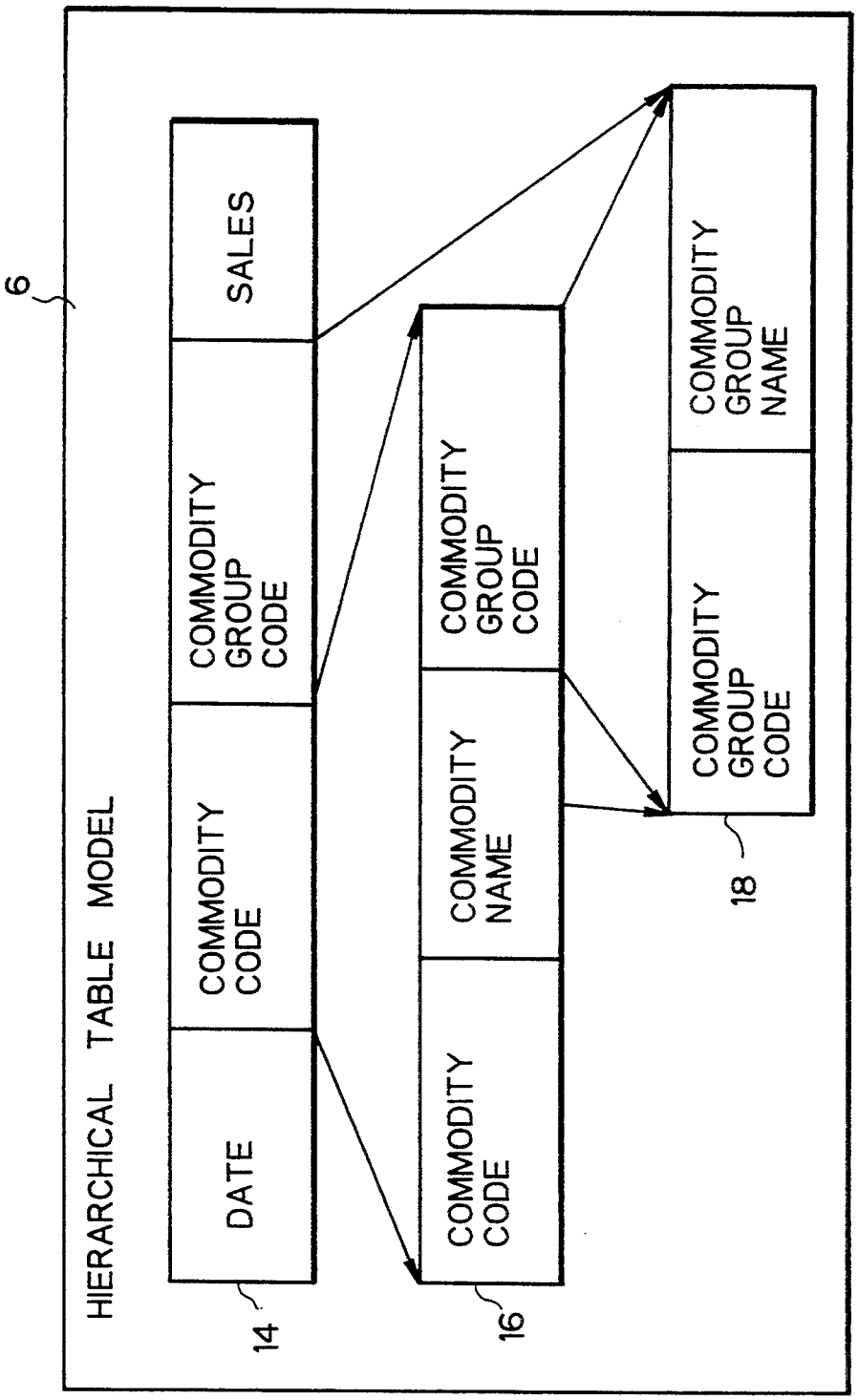
FIG. 3b is a more detailed depiction of the hierarchical table model 6 of FIG. 1.

The system then looks to the correspondence attribute for "uriage" (sales) (see FIG. 8a), which is "fun-sum (BB1-4)". The symbol "fun" indicates that some kind of calculation is needed. With the definition table B-21, if for example the last month is April of 1990, the value for the last month is obtained from the value for the current date as an operation result "19900400". In a similar manner, fun-sum (DB1-4) is an operation for obtaining the sum of the numerical values on the sales column (column 4) in Table A of the database (FIG. 3c). The system then may access Table A to sum all the sales entries in the sales column for commodity group code 200 items during the month of April 1990.

In this manner, the value of URI is filled and the database retrieval processing is terminated. The result is then outputted in a predetermined format.

The query must be converted into a query set forth in a database retrieval language to retrieve data from the database. To replace the structure of the Japanese natural language query with database retrieval formulas, it is necessary to put together the restrictions and grammar possessed by the database retrieval language in the terminology definition table 26 (FIG. 6). Construction of the queries in the database retrieval language are made by referring to this terminology definition table as described above. Further, having a separate grammar definition table 24 produces the advantage that all the changes to the database retrieval language may be absorbed by the grammar definition table, even when the present invention is applied to a system using a different database retrieval language.

As described above, by using the semantic marker of a terminology dictionary and the virtual table, a database is designated and a conversion is made into a retrieval logic formula which is suitable even when an ambiguous word is included in the query or an omission occurs in the input query.

As described, in the present invention, no hierarchical table model is needed. Further, no consideration of the hierarchical relation of the database is needed. Since the virtual tables have construction which directly reflects the hierarchical relation of database, construction and alteration is easy. Further, since the surface restriction and the semantic restriction are included in the virtual table, the collating unit can designate a highly probable database file by selecting a suitable virtual table even for an ambiguous input query.

In the above described example, the term "sengetsu" (last month) was included in the natural language query. This term was an ambiguous word related to time. The system also has the capability of properly analyzing other ambiguous terms relating to time. Suppose that the Japanese input sentence is "Kotoshi no haru no uriage ha" (Sale for the spring of this year?). The parser 22 (FIG. 6) decomposes this sentence into its constituent part "uriage" (sales) and "kotoshi no haru" (the spring of this year). Further, the parser 22 knows that "kotoshi no haru" modifies "uriage". The parser 22 looks up the term "kotoshi no haru" in the terminology dictionary 26 and is directed to an appropriate table in the virtual table 28. The entry in the virtual table directs the user to entry 3 in Definition Table A as shown in FIG. 15. This entry indicates that spring extends from 03/01 to 05/31. In this manner, the word "kotoshi no haru" (the spring of this year) contained in the syntax analysis result is replaced by "1990 nen 3 gatsu 1 nichi—1990 nen 5 gatsu 31 nichi" (Mar. 1 1990 May 31 1990).

In this example, however, any combination of time words to be used must be recorded on a terminology dictionary as a single word. For example, when it is desired that "kotoshi" (this year) and "haru" (spring) be combined "kotoshi no haru" (the spring of this year), it is necessary to previously record "kotoshi no haru" (the spring of this year) in the terminology dictionary 26 (FIG. 6). Further, since the definition of a seasonal word or the like differs from user to user, a terminology dictionary must be prepared for each user.

Figure 16A:
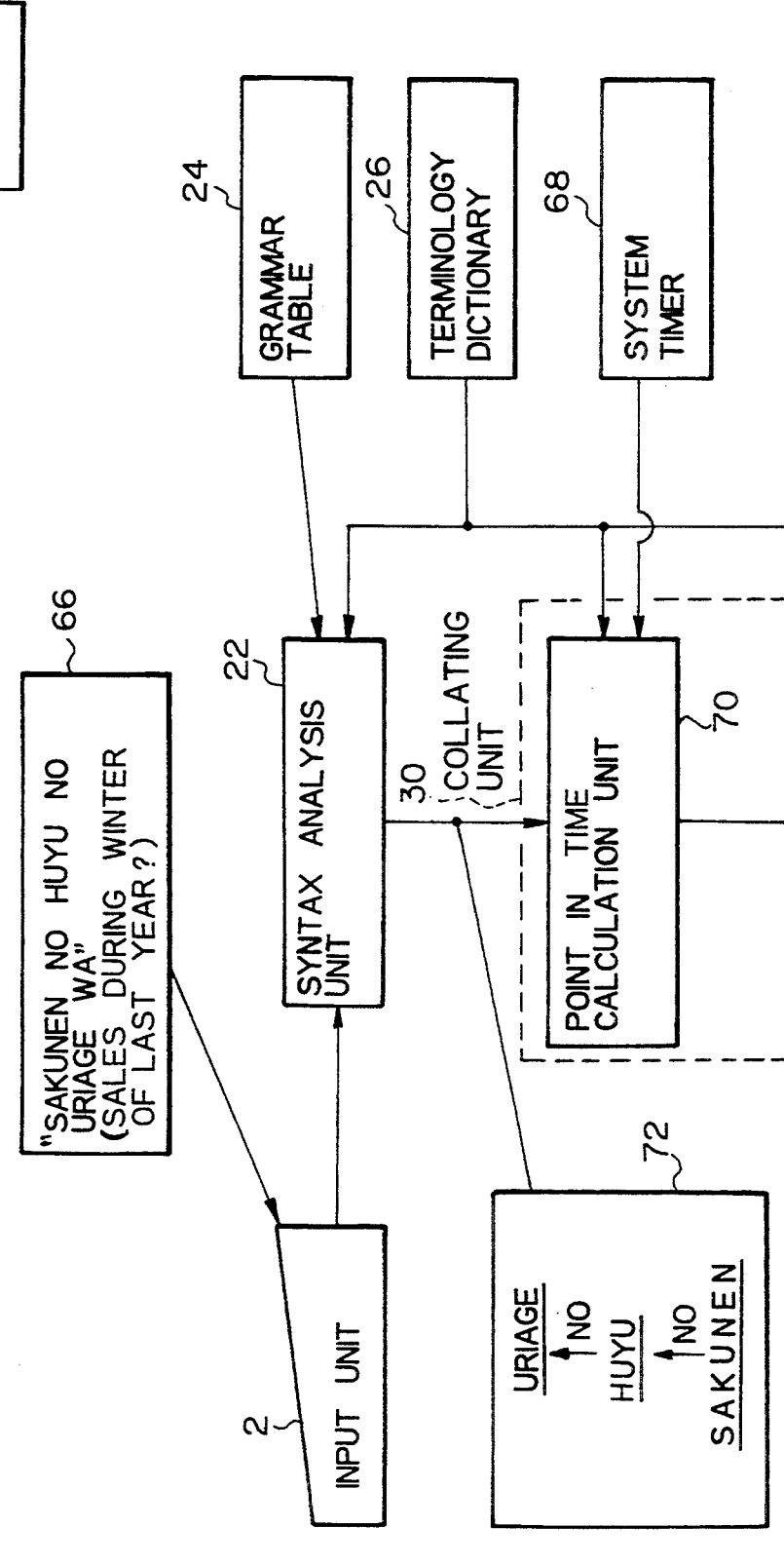
FIGS. 16a and 16b are diagrams illustrating the operation of the system with a query that employs the seasonal time period.
Figure 16B:
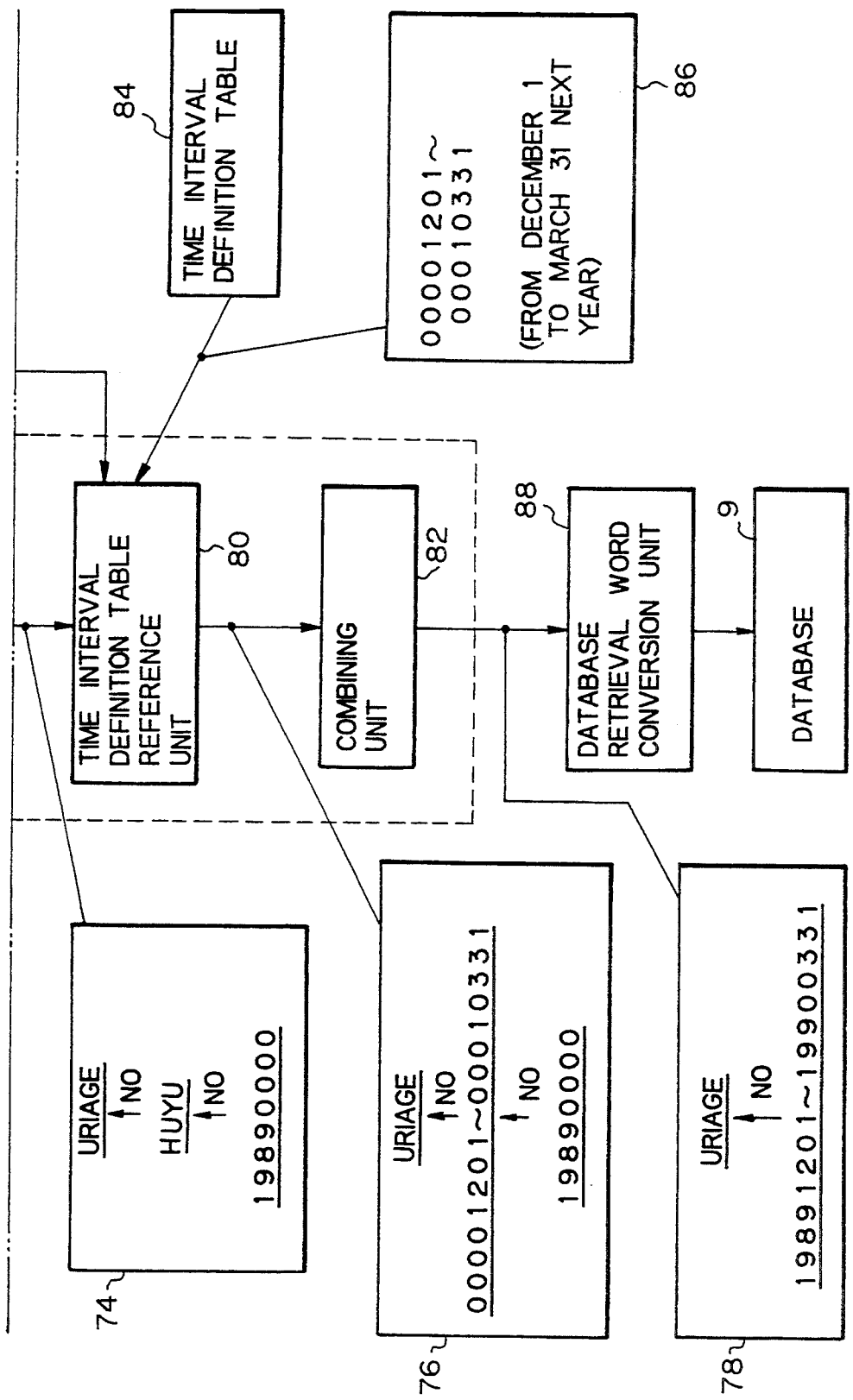

As such, an alternative embodiment as shown in FIGS. 16a and 16b may be employed. This alternative embodiment differs from the first embodiment in that it includes: a point in time calculation unit 70, for calculating a specific point in time from the current date, a time interval definition table reference unit 80, and a combining unit 82 for adding the reference result of the time interval definition table reference unit 80 and the calculated result of a point in time. Further, a system timer 68 is provided.

Suppose that "sakunen no fuyu no uriage ha" (Sales during the winter of the last year?) is entered from the input unit 2 as the input query 66 (FIG. 16a). The parser 22 generate a syntax analysis result 72 (i.e., a syntax tree) by employing the grammar table 24 and the terminology dictionary 26. The syntax analysis result contains "sakunen" (last year) and "fuyu" (winter), which are time words. The definition of the word "sakunen" (the last year) is obtained by time calculation, and the definition of the word "fuyu" (winter) is designated to be described in the time interval definition table 82 (FIG. 16b).

The syntax analysis result 72 is passed to the collating unit 30, where the result is received by the point in time calculation unit 70. At the point in time calculation unit 70, a point in time calculation is performed with respect to the current date (e.g., "19901224") that is obtained by a system timer 68. The actual calculation method performed is selected from the definition provided in Definition Table B in FIG. 11. The definition that is chosen depends on the value in the argument column in the terminology dictionary. In this example, an 8-digit integer value indicating the year "sakunen" (last year), "19890000", is obtained from the calculation method, corresponding to the value "11" in the argument column of "sakunen" (the last year), which states, "Subtract 1 from the four high order digits and replace the four low order digits with "0000". Subsequently, the calculated integer value is substituted for the portion of "sakunen" (the last year) in the syntax analysis result 72 to obtain a point in time calculation result 74.

The time interval definition reference unit 80 contains the actual dates corresponding to "fuyu" (winter). It obtains these dates by referring the time interval definition table 84. Hence, as shown in FIG. 15, "fuyu" is defined as starting at "00001201" (i.e., December 1) and ending at "00010331" i.e., March 31 of the next year). The time interval definition table reference unit 80 substitutes the retrieved value 86 for "fuyu" (winter) in the point in time calculation result 24 to obtain a time interval definition table reference result 76.

The combining unit 82 combines the actual dates corresponding to "sakunen" (the last year) and "fuyu" (winter) by addition to obtain a complete 8 digit range for dates for the interval as shown in the calculation result 78. Specifically, the year "19890000" is added to the dates of "fuyu""00001201"–"00010331" to obtain "19891201"—"19900331". The calculation result "19891201-19900331" means "from Dec. 1, 1989 to Mar. 31, 1990". The calculation result 78 is then processed as discussed in the first embodiment.

By changing the definition of each time word described in the time interval definition table 84 (FIG. 16b), the user may obtain a calculation result in accordance with definition without altering the terminology dictionary 26 (FIG. 16a). That is, it is possible for users to share a terminology dictionary and manage the time interval definition table individually. This benefit of sharing a terminology dictionary is more apparent when it is appreciated that a terminology dictionary is large in size and amendment of a terminology dictionary is difficult. Moreover, if words containing many modifiers are to be defined, storage requirements are large. Hence, providing a separate terminology dictionary for every user is cumbersome.

Figure 17A:
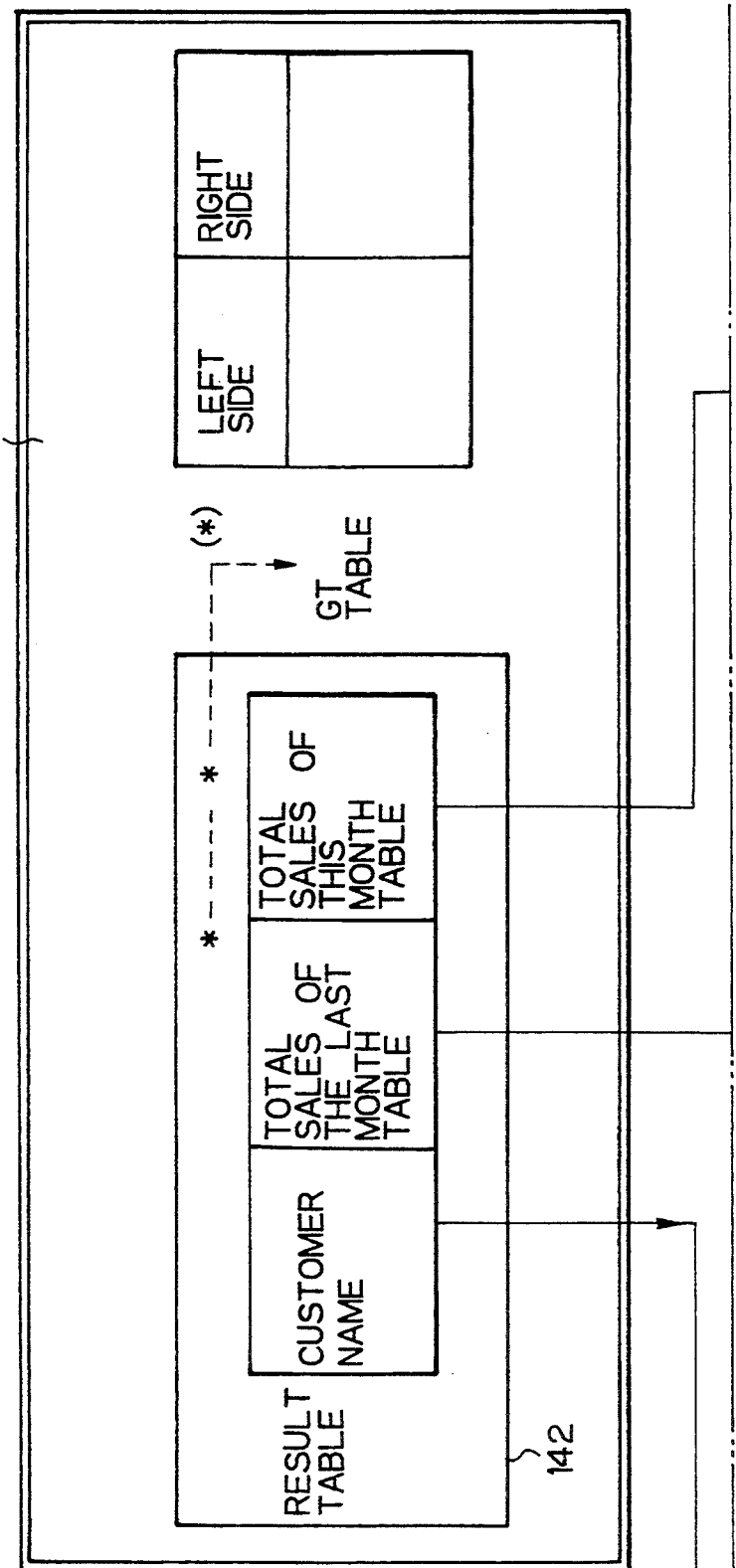
FIGS. 17a–17c illustrate the processing of an entity table logic formula.

The example input natural language queries 1 (FIG. 6) and 66 (FIG. 16a) requested sales information that could be readily reproduced by the system. The system, however, is capable of handling more sophisticated queries that require reasoning. For example, suppose that the Japanese input query is a sentence "Sengetsu no uriage yori kongetsu no uriage ga ooi tokuisaki ha" (What customer had more sales in this month than sales in the last month?). For such an input natural language query, the system produces a retrieving logic formula, also known as the entity table logic formula 14, in the form 140 shown in FIG. 17a. The formula 140 includes a result table 142 for storing the final results of the retrieved data. The result table 142 includes a location for storing the customer's name and tables for storing the total sales of this month and the total sales of last month. In addition, the entity table logic formula 140 includes a GT table, which is a table in the virtual table that performs a logical operation on parameters to determine if one parameter (the left side) is greater than the other (the right side).

Figure 17B:
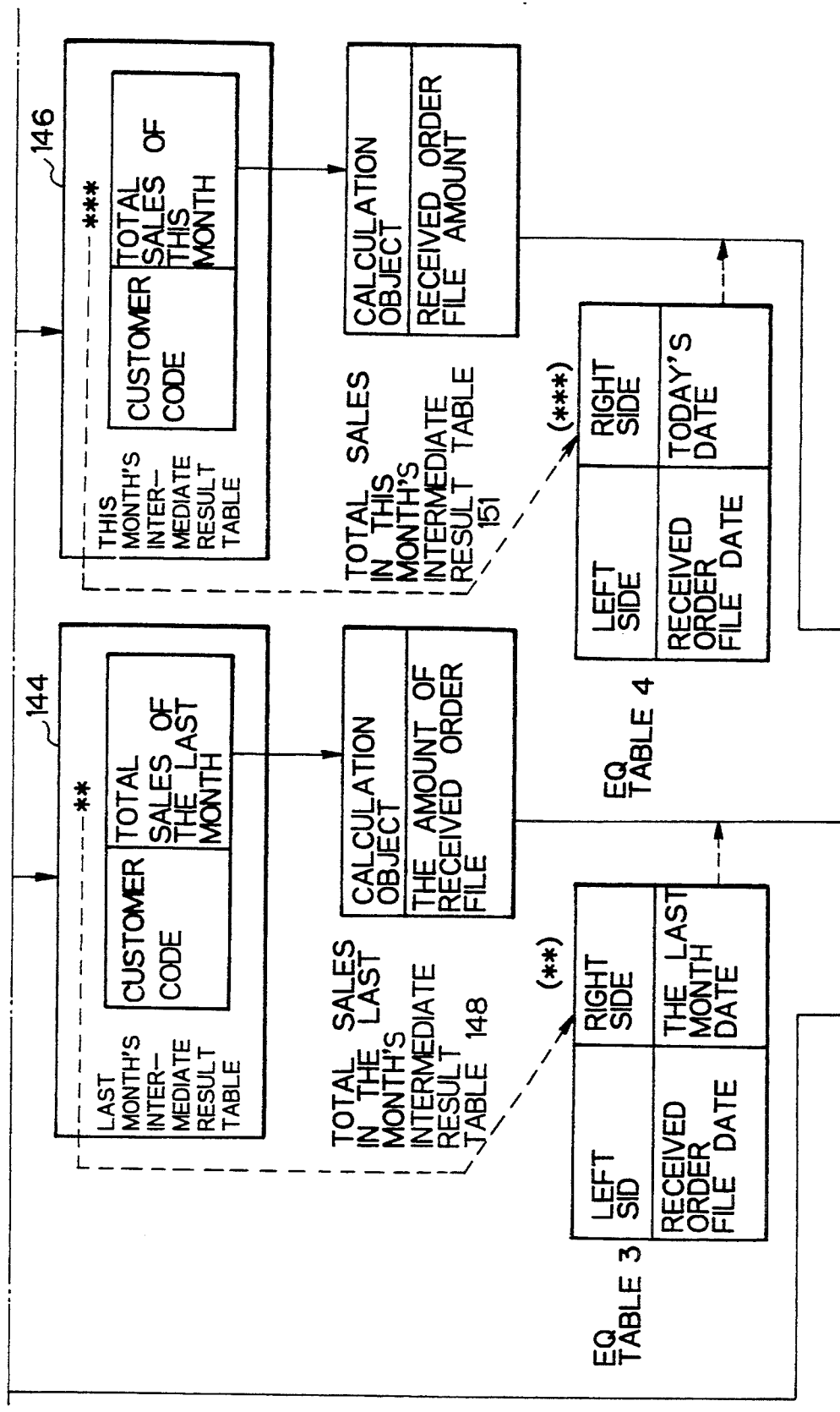

The total sales of the last month table includes a pointer pointing to a last month's intermediate result table 144 that holds the results of intermediate calculations that are necessary to determine the total sales of the last month. Similarly, the total sales of this month's table points to this month's intermediate result table 146. Both of the intermediate result tables 144 and 146 seek to have information regarding the customer code and the total sales for their respective months. In order to calculate the total sales of the last month, it is necessary to determine the calculation object (i.e., what kind of information is being sought). In addition, it is necessary to determine the amount of orders that were received during the month from that customer. Accordingly, there is an additional table, the total sales of the last month's intermediate result table 148. Analogously, a total sales in this month's intermediate result table 151 that seeks similar information for this month's sale, is also provided. Hence, the amount of received order for this month and last month for the specified customer code are requested and passed to the database formula generation unit 32 which converts the logic formula into a database retrieval formula 157 using the database retrieval word grammar definition table 155. The result table and the various intermediate result tables 144, 146, 148 and 151 are passed to the database formula generation unit 32. In addition, equality tables (denoted as EQ tables) are passed to the database formula generation unit 32. Specifically, EQ Tables 3 and 4, as shown in FIG. 17b, are passed to the database formula generation unit 32, EQ Table 3 seeks to determine if the received order file date is equal to the last month date, and EQ Table 4 seeks to determine if the received order file date is equal to today's date.

Figure 17C:
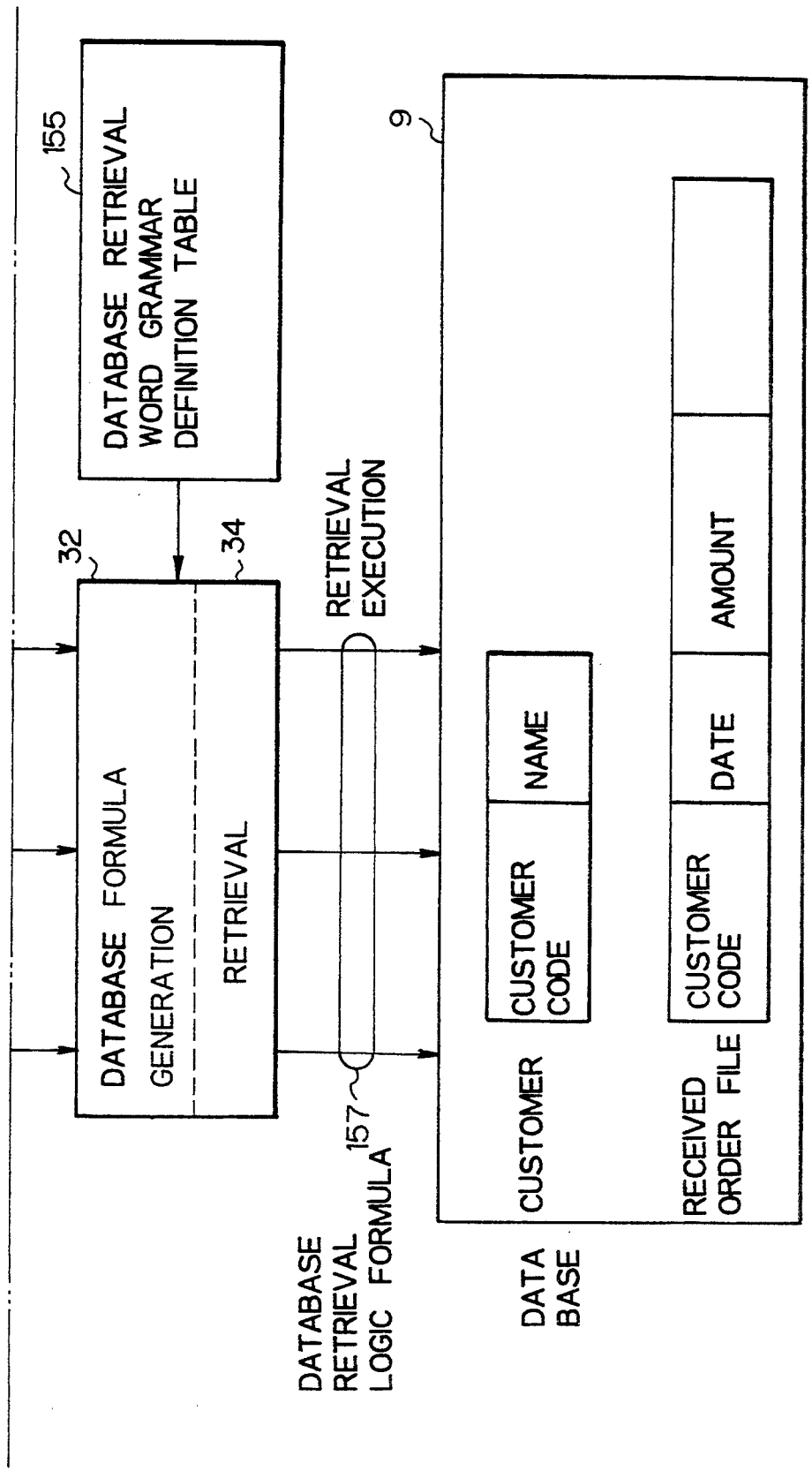

The entity table logic formula 140 is processed by the database formula generation unit 32 (FIG. 17c) which uses the database retrieval word grammar definition table to process the logic formula 140. The database retrieval word grammar definition table is examined by the database formula generation unit 32 with respect to the retrieval logic formula 140. The database retrieval word definition table initially processes result table as indicated in FIG. 18. In particular, the system is directed to select the SELECT (item) FROM (reference table) WHERE (condition). Thus, the result table is converted into a database retrieval formula of <interrogation 3> of FIG. 19. The retrieval word grammar definition table 155 has a similar entry for the intermediate result tables 144 and 146. Further, the database formula generation unit 32 investigates the executing order of the specified operations with respect to another. In this case, since the result table 142 designates last month's intermediate result table 144 and this month's intermediate result table 146 as "left side>right side" in the GT table, it is learned that the operation of left side and right side must be performed before the GT table can be processed. In other words, it is seen that determination of the intermediate result tables must be performed first.

In this manner the execution order is determined as <interrogation 1>, <interrogation 2> (there is no restriction on the executing order of these two), <interrogation 3>.

The system proceeds to process each of the interrogations as indicated in FIG. 19. In particular, for interrogation 1, which is interrogation for the last month's intermediate result table, the customer table in the database 9 (FIG. 17c) is retrieved using retrieval unit 34 to obtain the customer code information. Furthermore, the system seeks to sum the amount fields in the received order file of the database 9. In order to perform this calculation, the system sums the amount entries having the appropriate customer code and which meet the date limitations of last month. The EQ table 3 is used to ensure that the date requirements are fulfilled. In this fashion, the intermediate result table is filled in with the relevant information.

Interrogation 2 involves the processing for this month's intermediate result table. The processing is the same as interrogation 1 except that different date requirements are utilized. Specifically, the date must correspond to the limitations for this month. In this fashion, the information for this month's intermediate result table is completed.

Lastly, interrogation 3 is processed. The interrogation 3 is the interrogation for the result table. As FIG. 19 indicates, the customer table in the database customer and name are selected, as are the total sales of this last month table and the total sales of this month table. This information is retrieved from the customer table in the database 9 (FIG. 17c) and from the last month's intermediate result table 144 (FIG. 17b) and this month's intermediate result table 146. In order for the customer name to be output, the sales of this month table must be greater than the sales of last month table and the customer code of this month's intermediate result table must equal the customer table and code.

In this manner, automatic generation of database retrieval formula is possible. Operations are connected by means of pointer and a logic unit for judging executing order is provided in the database formula generator unit 32 in FIG. 6.

Further, this approach provides the additional advantage a plurality of sequenced data retrievals are possible by way of intermediate results. The system also provides the advantage that it is possible to readily conform to a different database retrieval language by altering the grammar definition table.

Specifically, when the retrieval language is changed, the database retrieval formula for a new retrieval language may be generated and an extensive rewriting thereof is not necessary. Rather, a simple change in the description of (item), (reference table), (condition) or SELECT, FROM, WHERE of the designated item to the result table of the grammar definition table is all that is required.

For some natural Japanese queries, a complicated or plurality of processing must be performed to analyze the query. For example, there are instances where data conforming to specific periods of specific conditions are added together. It is often desirable to be able to perform a preprocessing operation at the collating unit for comparison or grouping. Hence, such preprocessing may be incorporated into the present invention.

In order to explain such preprocessing, suppose that the input query is "Mitsubishi shooten no uriage yori uriage ga ooi tokuisaki ha" (What a customer has more sales than Mitsubishi shooten?) or "(A-shooten no) kotoshi no haru kara aki made no uriage ha" (How much were the sales to (A store) from the spring to fall of this year?). FIGS. 20a and 20b are helpful in explaining the structure of a syntax tree that is produced for an input query which requires a plurality of logic formula groups. First, the input sentence is broken down by the parser 22 (FIG. 6) into elements in the form of a tree structure (i.e., the syntax tree) such as the tree denoted as "HIKAKU" (comparison) in FIG. 20a and the tree denoted as "KARA MADE" (from to) in FIG. 20b. FIG. 20a shows the syntax tree for the first example query, and FIG. 20b shows the syntax tree for the second example query. Particles are detected and the elements are forcibly divided at the parser 22 (FIG. 6). In FIGS. 20a and 20b "ji" refers to a word serving as a key and "fu" is a modifier. The modifier is used to refer to the surface restriction or is regarded as a special modifier in searching the virtual table.

The first example query, as shown in FIG. 20a, seek to compare sales of two entities. As such, two tables have to be selected. If a table is selected so that a comparison cannot be made. Two tables can be selected by dividing the syntax tree into groups. A virtual table (see FIG. 21a) corresponding to a comparison expression like the "ooi hyo" shown in FIG. 20a is provided and a virtual table logic formula for comparison is generated by indicating the relation between the two tables with the comparison virtual table. The comparison virtual table can be used for converting a word indicating a comparison meaning in any language to an expression such as, [GT] (greater than). The two virtual table logic formulas are set by Group (a) in FIG. 20a.

In a similar manner, as shown in FIG. 21b, by using the virtual table constructed to have "kara made" (from ... to), "yori made" (from ... to) tables the intermediate logic formulas are determined by Group (b) as shown in FIG. 20b. It is designated at FIG. 21b to refer to the definition formula, and actual dates are determined by the operation discussed above.

Also, interrogatives may be dealt with to some extent by providing an item for surface restriction in the virtual table and by investigating the items relative to the surface restriction. For example, with respect to an input sentence "Nani wo uttaka" (What was sold?), since only a commodity name or commodity group name falls under those with the surface restriction "wo" in "uru hyo", it is possible to assume that "nani" (what) refers to one of them.

Further, by collating surface restriction, it is possible to check particle and to display an error message for an input sentence with an erroneous content. For example, with respect to a sentence "Chokoreeto ga utta shoohin ha" (What commodity sold by chocolates?), since there is no "ga" in the surface restriction of "shoohin" in "uru hyo", it is judged as an error and it is possible to display an error message "Zyoshi ga chigai masu" (Wrong "zyoshi" is used).

In the system of FIG. 1 described as a conventional example, an answer is provided in the same format at all times. That is, in answering the retrieval result, the response is made in a tabular format and not in a sentence format. In some cases, the answer in this format is difficult to view. To eliminate this disadvantage, a response format selection unit may be provided in the retrieval unit. This unit should provide at least two types of formats, i.e., a tabular format and sentence format, as the outputting format.

While the present invention has been shown with respect to preferred embodiments thereof, those skilled in the art will know of other alternative embodiments which do not depart from the spirit and scope of the invention as defined in the appended claims. For instance, the system may be adjusted to operate on natural language queries that are formulated in languages other than Japanese. Further, the system may be implemented on data processing system other than that shown in FIG. 2.

What is claimed is:

1. A computer implemented information retrieval system for retrieving information from a database, comprising:
   a parser for parsing a natural language query into its constituent phrases to produce a syntax analysis result;
   a plurality of virtual tables for converting phrases of the natural language query to retrieval keys possessed by the database, said virtual tables accounting for particles that modify the phrases;
   a collating unit for preparing a database retrieval formula from the syntax analysis result by selecting at least one virtual table that is used to convert the phrases of the natural language query to keys possessed by the database; and
   a retrieval execution unit for retrieving data from the database based on said database retrieval formula.

2. An information retrieval system as recited in claim 1 wherein one of said virtual tables is a table for converting an undetermined value phrase in the natural language query into a determined value phrase in the database based on the syntax analysis result.

3. An information retrieval system as recited in claim 1 further comprising:
   a terminology dictionary for identifying entries in the virtual table to be used in converting the phrases of natural language query, said dictionary including words representing time, and said terminology dictionary being used by the parser in obtaining the syntax analysis result; and
   wherein one of said virtual tables is a time interval definition table for defining dates corresponding to said words representing time.

4. An information retrieval system as recited in claim 1 further comprising:
   a database retrieval formula conversion unit for generating a formula in a database retrieval language from the database retrieval formula.

5. The information retrieval system according to claim 1, wherein each of said virtual tables associates elements in the table with elements in at least another one of said virtual tables and the database.

6. The information retrieval system according to claim 1, further comprising a terminology dictionary being used by said parser to produce said syntax analysis result, said terminology dictionary associating each of said phrases with at least one virtual table.

7. The information retrieval system according to claim 6, wherein said terminology dictionary associates phrases which are not in said database with phrases which are in said database.

8. The information retrieval system according to claim 6, wherein said terminology dictionary associates phrases with keys possessed by the database.

9. The information retrieval system according to claim 1,
   wherein said collating unit produces a plurality of database retrieval formula from the syntax analysis result; and
   said information retrieval system further comprising a comparison table receiving data from said retrieval execution unit based upon each of said plurality of database retrieval formula.

10. The information retrieval system according to claim 9, further comprising a comparison execution unit for retrieving data from said comparison table based on a retrieval formula from said collating unit.

11. A computer implemented information retrieval system for retrieving information from a database, comprising:

a parser for parsing a natural language query into its constituent phrases to produce a syntax analysis result;

a plurality of virtual tables for converting phrases of the natural language query to retrieval keys possessed by the database, said virtual tables accounting for particles that modify the phrases;

a collating unit for preparing a database retrieval formula from the syntax analysis result by selecting at least one of said virtual tables that is used to convert the phrases of the natural language query to keys possessed by the database;

a retrieval execution unit for retrieving data from the database based on said database retrieval formula;

wherein one of said virtual tables is a table for converting an undetermined value phrase in the natural language query into a determined value phrase in the database based on the syntax analysis result;

a terminology dictionary for identifying entries in the virtual table to be used in converting the phrases of natural language query, said dictionary including words representing time, and said terminology dictionary being used by the parser in obtaining the syntax analysis result;

wherein one of said virtual tables is a time interval definition table for defining dates corresponding to said words representing time; and a database retrieval formula conversion unit for generating a formula in a database retrieval language from the database retrieval formula.

* * * * *